United States Patent
Lee et al.

(10) Patent No.: US 11,790,613 B2
(45) Date of Patent: Oct. 17, 2023

(54) IMAGE OUTPUT DEVICE

(71) Applicant: LG Electronics Inc., Seoul (KR)

(72) Inventors: Kihyung Lee, Seoul (KR); Yujung Jang, Seoul (KR); Dukyung Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 145 days.

(21) Appl. No.: 17/427,414

(22) PCT Filed: Jan. 30, 2020

(86) PCT No.: PCT/KR2020/001409
§ 371 (c)(1),
(2) Date: Jul. 30, 2021

(87) PCT Pub. No.: WO2020/159247
PCT Pub. Date: Aug. 6, 2020

(65) Prior Publication Data
US 2022/0101611 A1    Mar. 31, 2022

Related U.S. Application Data

(60) Provisional application No. 62/799,693, filed on Jan. 31, 2019.

(30) Foreign Application Priority Data

Jun. 28, 2019    (KR) .................. 10-2019-0078221

(51) Int. Cl.
*G06T 19/00*        (2011.01)
*B60K 35/00*        (2006.01)
(Continued)

(52) U.S. Cl.
CPC ............ *G06T 19/006* (2013.01); *B60K 35/00* (2013.01); *B60W 50/14* (2013.01);
(Continued)

(58) Field of Classification Search
CPC ............... G06T 19/006; B60K 35/00; B60K 2370/177; B60K 2370/152;
(Continued)

(56) References Cited

U.S. PATENT DOCUMENTS 9,140,782 B2    9/2015    Alberth, Jr. et al.
10,701,420 B2    6/2020    Moore et al.
(Continued)

FOREIGN PATENT DOCUMENTS

JP    2017173125    9/2017
KR    1020150054022    5/2015
(Continued)

OTHER PUBLICATIONS

Office Action in U.S. Appl. No. 17/427,408, dated May 11, 2022, 16 pages.
(Continued)

*Primary Examiner* — Jeffery A Brier
(74) *Attorney, Agent, or Firm* — Fish & Richardson P.C.

(57) ABSTRACT

The present invention relates to an image output device mounted on a vehicle so as to implement augmented reality, and a control method therefor. At least one from among an autonomous vehicle, a user terminal, and a server of the present invention can be linked with an artificial intelligence module, a drone (unmanned aerial vehicle, UAV), a robot, an augmented reality (AR) device, a virtual reality (VR) device, a device related to a 5G service, and the like.

20 Claims, 30 Drawing Sheets

(51) Int. Cl.
  *B60W 50/14* (2020.01)
  *G02B 27/01* (2006.01)
  *G05D 1/00* (2006.01)

(52) U.S. Cl.
  CPC ....... *G02B 27/0101* (2013.01); *G05D 1/0088* (2013.01); *B60K 2370/177* (2019.05); *G02B 2027/0138* (2013.01); *G02B 2027/0145* (2013.01); *G05D 2201/0213* (2013.01)

(58) Field of Classification Search
  CPC ........ B60K 2370/166; B60K 2370/176; B60K 2370/179; B60K 2370/21; B60W 50/14; G02B 27/0101; G02B 2027/0138; G02B 2027/0145; G02B 2027/014; G02B 27/0093; G02B 2027/0187; G05D 2201/0213; G05D 1/0088
  See application file for complete search history.

(56) References Cited

U.S. PATENT DOCUMENTS

| | | | |
|---|---|---|---|
| 11,163,317 | B2 | 11/2021 | Kelkar et al. |
| 2004/0138809 | A1 | 7/2004 | Mukaiyama |
| 2009/0234859 | A1 | 9/2009 | Grigsby et al. |
| 2014/0297174 | A1 | 10/2014 | Tomizawa |
| 2014/0327557 | A1 | 11/2014 | Nordbruch et al. |
| 2016/0069702 | A1 | 3/2016 | Takimoto et al. |
| 2017/0187963 | A1* | 6/2017 | Lee ........................ G02B 27/01 |
| 2017/0293950 | A1 | 10/2017 | Rathod |
| 2018/0066956 | A1 | 3/2018 | Kim et al. |
| 2018/0188045 | A1 | 7/2018 | Wheeler et al. |
| 2019/0035127 | A1* | 1/2019 | Choi ........................ G06T 3/20 |
| 2020/0005639 | A1 | 1/2020 | Walsh |
| 2020/0064142 | A1 | 2/2020 | Choi et al. |
| 2020/0074735 | A1 | 3/2020 | Nowakowski et al. |
| 2020/0086789 | A1 | 3/2020 | Nowakowski et al. |
| 2020/0164799 | A1 | 5/2020 | Nowakowski et al. |

FOREIGN PATENT DOCUMENTS

| | | | |
|---|---|---|---|
| KR | 1020150144681 | 12/2015 | |
| KR | 10-2016-0134005 | 11/2016 | |
| KR | 1020170101758 | 9/2017 | |
| KR | 1020170128684 | 11/2017 | |
| WO | WO-2017119541 A1 * | 7/2017 | ............ B60W 10/18 |

OTHER PUBLICATIONS

Extended European Search Report in European Appln. No. 20749319.8, dated Apr. 24, 2023, 10 pages.

Office Action in U.S. Appl. No. 17/427,408, dated Mar. 16, 2023, 18 pages.

* cited by examiner

FIG. 3
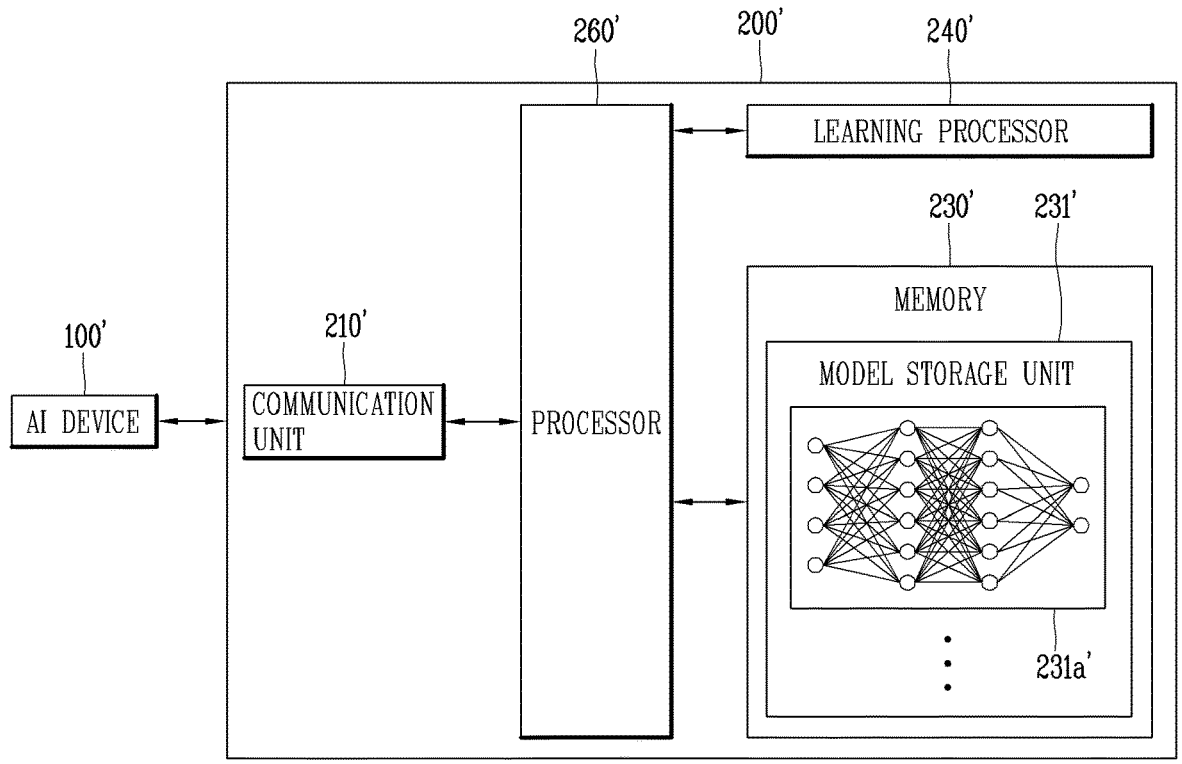
FIG. 4
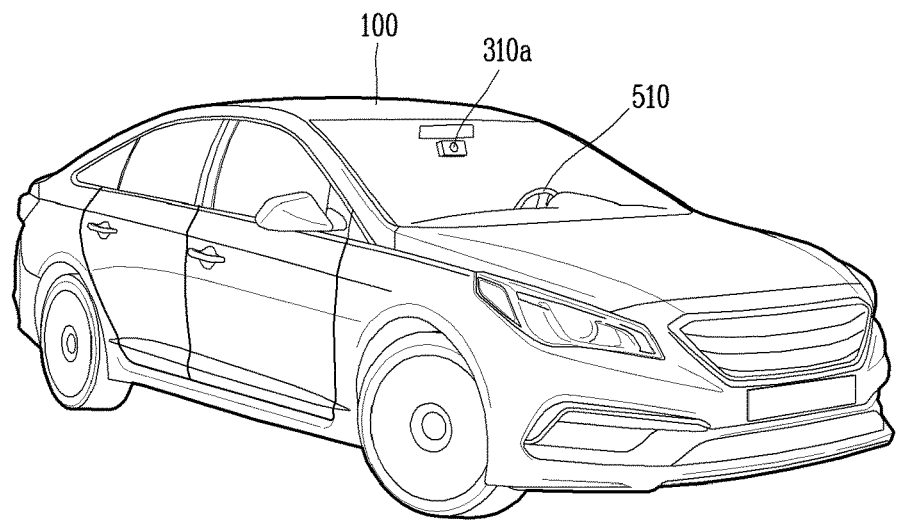
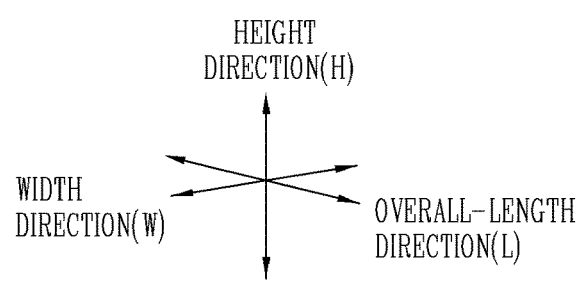

IMAGE OUTPUT DEVICE

CROSS-REFERENCE TO RELATED APPLICATIONS

This application is a National Stage application under 35 U.S.C. § 371 of International Application No. PCT/KR2020/001409, filed on Jan. 30, 2020, which claims the benefit of Korean Application No. 10-2019-0078221, filed on Jun. 28, 2019, and U.S. Provisional Application No. 62/799,693, filed on Jan. 31, 2019. The disclosures of the prior applications are incorporated by reference in their entirety.

TECHNICAL FIELD

The present disclosure relates to an image output device provided in a vehicle to enable augmented reality, and a method for controlling the same.

BACKGROUND

A vehicle refers to means of transporting people or goods by using kinetic energy. Representative examples of vehicles include automobiles and motorcycles.

For safety and convenience of a user who uses the vehicle, various sensors and devices are provided in the vehicle, and functions of the vehicle are diversified.

The functions of the vehicle may be divided into a convenience function for promoting driver's convenience, and a safety function for enhancing safety of the driver and/or pedestrians.

First, the convenience function has a development motive associated with the driver's convenience, such as providing infotainment (information+entertainment) to the vehicle, supporting a partially autonomous driving function, or helping the driver ensuring a field of vision at night or at a blind spot. For example, the convenience functions may include various functions, such as an active cruise control (ACC), a smart parking assist system (SPAS), a night vision (NV), a head up display (HUD), an around view monitor (AVM), an adaptive headlight system (AHS), and the like.

The safety function is a technique of ensuring safeties of the driver and/or pedestrians, and may include various functions, such as a lane departure warning system (LDWS), a lane keeping assist system (LKAS), an autonomous emergency braking (AEB), and the like.

In order to further improve the convenience functions and the safety functions, a vehicle-specific communication technology is being developed. For example, a vehicle to infrastructure (V2I) that enables communication between a vehicle and an infrastructure, a Vehicle to Vehicle (V2V) that enables communication between vehicles, a Vehicle to Everything (V2X) that enables communication between a vehicle and an object, and the like.

An image output device for visually providing an occupant or passenger on board with various information may be disposed at a vehicle. The image output device includes a head-up display (HUD) that presents information through a windshield of a vehicle or a separately provided transparent screen, and/or various displays that output information through a panel.

The image output device is evolving into a way to provide route navigation information to the destination and information regarding a point of interest (POI) while effectively providing various information. In particular, a research has been conducted to provide an image output device that can directly and effectively provide necessary information in a manner that does not interfere with driving of the driver who needs to pay attention while driving.

SUMMARY

The present disclosure is directed to solving the aforementioned problems and other drawbacks.

The present disclosure describes an image output device that can provide various types of information to an occupant or passenger on board using augmented reality, and a method for controlling the same.

The present disclosure also describes an image output device that can provide route or path navigation information using augmented reality so as to prevent a collision with another vehicle when changing lanes.

The present disclosure also describes an image output device that can provide more accurate route navigation information to a driver.

According to one aspect of the subject matter described in this application, an image output device is provided in a vehicle to enable augmented reality. The image output device includes a controller configured to receive, in real time, a forward image capturing an image in front of the vehicle, search for one or more lanes on which the vehicle is expected to travel in the forward image, generate image information including a carpet image indicating the searched one or more lanes in lane units, and transmit the image information to an image output unit that outputs visual information so that the image information is output to the image output device. The controller receives location information and route information of another vehicle located within a predetermined distance from the vehicle, and generates, when the location information and route information received from the another vehicle satisfy a preset condition, image information that includes a carpet image having a different shape from the carpet image based on the location information and the route information.

Implementations according to this aspect may include one or more of the following features. For example, the controller may generate image information that includes a carpet image having a different shape from the carpet image based on the location information and the route information when a route on which the vehicle is expected to travel and a route on which the another vehicle is expected to travel are at least partially the same.

In some implementations, the carpet image may include a first sub carpet image indicating a current driving lane of the vehicle, a second sub carpet image indicating a target lane of the vehicle, and a third sub carpet image connecting the first and second sub carpet images to guide a path for a lane change.

In some implementations, when the location information and route information received from the another vehicle satisfy the preset condition, the controller may generate image information including different sub carpet images, generated by changing lengths of the first and second sub carpet images, based on the location information and the route information received.

In some implementations, the controller may generate image information including a different sub carpet image, generated by changing a length of the third sub carpet image connecting the first and second sub carpet images when the lengths of the first and second sub carpet images are changed.

In some implementations, the controller may generate image information only including the first sub carpet image or image information including the first to third sub carpet images based on a distance between a point at which a lane of the vehicle is to be changed and the vehicle.

In some implementations, a part of the first to third sub carpet images may have a different color from remaining sub carpet images.

In some implementations, the controller may calculate current lane information of the vehicle using the forward image, and generate image information including the carpet image based on the calculated lane information.

In some implementations, the controller may recalculate the current lane information of the vehicle based on the location information and the route information received from the another vehicle, and generate image information including a carpet image different from the carpet image when the calculated lane information using the forward image is different from the recalculated lane information.

According to another aspect, an image output device is provided in a vehicle to enable augmented reality. The device includes: an image output unit configured to output visual information for enabling the augmented reality; a communication unit configured to communicate with other vehicles and a server, and receive, in real time, a forward image capturing an image in front of the vehicle; and a controller configured to control the image output unit to search for one or more lanes on which the vehicle is expected to travel in the forward image, and to output a carpet image indicating the searched one or more lanes in lane units. The controller controls the communication unit to receive location information and route information of another vehicle located within a predetermined distance from the vehicle, and controls, when the location information and route information received from the another vehicle satisfy a preset condition, the image output unit such that the carpet image is changed based on the location information and the route information.

According to another aspect, a method for controlling an image output device provided in a vehicle to enable augmented reality. The method includes receiving a forward image capturing an image in front of the vehicle; searching for one or more lanes on which the vehicle is expected to travel in the forward image; receiving location information and route information of another vehicle located within a predetermined distance from the vehicle; generating image information that includes a carpet image indicating the searched one or more lanes in lane units using at least one of the forward image, the location information of the another vehicle, and the route information of the another vehicle; and transmitting the image information to the image output unit. The method further includes generating, when the location information and route information received from the another vehicle satisfy a preset condition, image information that includes a carpet image having a different shape from the carpet image based on the location information and the route information.

In some implementations, the present disclosure may further include generating image information that includes a carpet image having a different shape from the carpet image based on the location information and the route information when a route on which the vehicle is expected to travel and a route on which the another vehicle is expected to travel are at least partially the same.

In some implementations, the carpet image may include a first sub carpet image indicating a current driving lane of the vehicle, a second sub carpet image indicating a target lane of the vehicle, and a third sub carpet image connecting the first and second sub carpet images to guide a path for a lane change.

In some implementations, the present disclosure may further include generating, when the location information and route information received from the another vehicle satisfy the preset condition, image information including different sub carpet images, generated by changing lengths of the first and second sub carpet images, based on the location information and the route information.

In some implementations, the present disclosure may further include generating image information including a different sub carpet image, generated by changing a length of the third sub carpet image connecting the first and second sub carpet images when the lengths of the first and second sub carpet images are changed.

In some implementations, the present disclosure may further include generating image information only including the first sub carpet image or image information including the first to third sub carpet images based on a distance between a point at which a lane of the vehicle is to be changed and the vehicle.

In some implementations, a part of the first to third sub carpet images may have a different color from remaining sub carpet images.

In some implementations, the present disclosure may further include calculating current lane information of the vehicle using the forward image, and generating image information including the carpet image based on the calculated lane information.

In some implementations, the present disclosure may further include recalculating the current lane information of the vehicle based on the location information and the route information received from the another vehicle, and generating image information including a carpet image different from the carpet image when the calculated lane information using the forward image is different from the recalculated lane information.

In some implementations, the recalculating of the current lane information of the vehicle may be performed when a lane is not recognizable form the forward image, or when there in an error in lane information of a map road link received from the outside.

An image output device and a method for controlling the same according to implementations of the present disclosure may provide the following benefits.

According to the implementations of the present disclosure, as a path that can avoid collision with another vehicle during a lane change is provided through data transmission and reception between a vehicle of a driver and other vehicles to thereby prevent a traffic accident when the driver changes a lane.

In addition, current lane information of the vehicle can be changed through data transmission and reception between the vehicle and other vehicles nearby. Thus, the present disclosure can provide more accurate route navigation information to the driver.

BRIEF DESCRIPTION OF THE DRAWINGS

FIG. 3 illustrates an AI system according to one implementation of the present disclosure;

FIG. 4 illustrates an outer appearance of a vehicle according to an implementation of the present disclosure;

DETAILED DESCRIPTION

Figure 1:
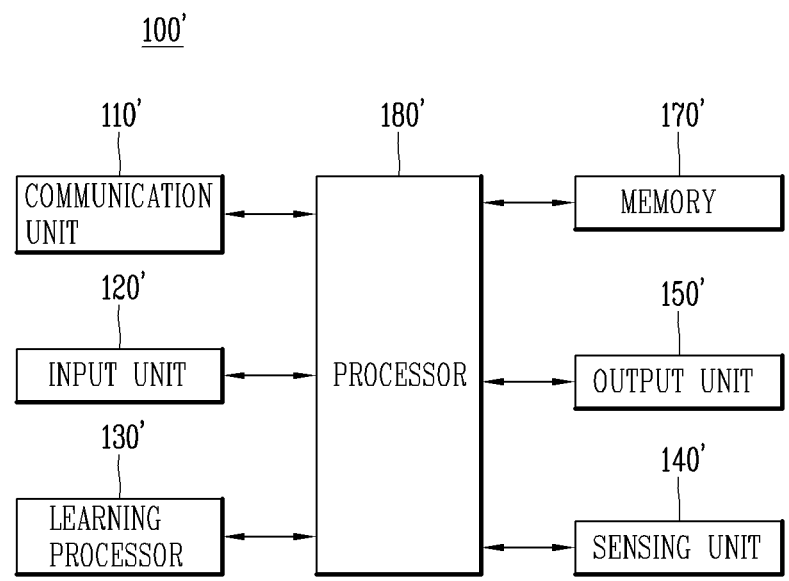
FIG. 1 illustrates an AI device according to one implementation of the present disclosure.

Description will now be given in detail according to one or more implementations disclosed herein, with reference to the accompanying drawings. In the drawings, the same or similar elements are designated with the same or similar reference numerals, and redundant description has been omitted. The suffixes "module" and "unit" for components or elements used in the following description are given or mixed in consideration of ease in creating specification, and do not have distinct meanings or roles. In describing implementations, if a detailed explanation for a related known technology or construction is considered to unnecessarily divert the main point, such explanation has been omitted but would be understood by those skilled in the art. Also, it should be understood that the accompanying drawings are merely illustrated to easily explain the concept, and therefore, they should not be construed to limit the technological concept disclosed herein by the accompanying drawings, and the concept should be construed as being extended to all modifications, equivalents, and substitutes included in the concept and technological scope.

Terms including ordinal numbers such as first and second may be used to describe various elements, but the elements are not limited by the terms. The terms are used merely for the purpose to distinguish an element from another element.

It will be understood that when an element is referred to as being "connected with" another element, the element can be directly connected with the other element or intervening elements may also be present. On the contrary, in case where an element is "directly connected" or "directly linked" to another element, it should be understood that any other element is not existed therebetween.

Singular expressions include plural expressions unless the context clearly indicates otherwise.

Terms "include" or "has" used herein should be understood that they are intended to indicate the existence of a feature, a number, a step, a constituent element, a component or a combination thereof disclosed in the specification, and it may also be understood that the existence or additional possibility of one or more other features, numbers, steps, elements, components or combinations thereof are not excluded in advance.

A vehicle disclosed herein may include various types of automobiles such as cars, motorcycles, and the like. Hereinafter, the vehicle will be described based on a car.

Artificial intelligence (AI) is the field of study devoted to making machines intelligent or a methodology to create it, and machine learning is the study of defining and solving various problems dealt with in the field of the artificial intelligence. Machine learning is also defined as an algorithm that improve the performance of a task through experience.

An artificial neural network (ANN) is a (computational) model used in machine learning, which may refer in general to a model with problem-solving capabilities that consists of artificial neurons (nodes) forming a network by synaptic connections. The ANN may be defined by a connection pattern between neurons of different layers, a learning process of updating model parameters, and an activation function for generating an output value.

The ANN may include an input layer, an output layer, and optionally one or more hidden layers. Each layer includes one or more neurons, and the ANN may include synapses for connecting neurons. In the ANN, each neuron can output a function value of the activation function for input signals, weights, and biases input through the synapse.

Model parameters refer to parameters determined through learning, and include a weight value of synaptic connection and biases of neurons. A hyperparameter refers to a parameter that should be set prior to learning in a machine learning algorithm, which includes a learning rate, the number of repeats, a mini-batch size, an initialization function, and the like.

The purpose of training the ANN may be for determining a model parameter that can minimize a loss function. The loss function may be used as an index for determining an optimal model parameter in the training process of the ANN.

Machine learning can be classified into supervised learning, unsupervised learning, and reinforcement learning according to a learning method.

The supervised learning may refer to a method of training an ANN using labeled training data, and a label may indicate the correct answer (or result value) that the ANN must infer when training data is input thereto. The unsupervised learning may refer to a method of training an ANN using unlabeled data. The reinforcement learning may refer to a method for training an agent defined in a certain environment to select actions or a sequence of selecting actions that maximizes cumulative rewards in each state.

Machine learning implemented as a deep neural network (DNN) including a plurality of hidden layers is referred to as deep learning, which is a class of machine learning. Machine learning used herein includes deep learning.

A robot is a machine designed to automatically handles one or more tasks by its own ability or be automatically operated. In particular, a robot capable of carrying out a series of actions by recognizing the environment and making a decision by itself may be referred to as an intelligent (or smart) robot.

Robots can be classified into an industrial robot, a medical robot, a household robot, a military robot, and the like depending on the purpose of use or field.

The robot may be equipped with a drive (or driving) unit that includes an actuator or a motor to allow the robot to perform various physical operations or actions such as moving joints. In addition, a mobile or moving robot includes a wheel, a brake, a propeller, and the like in a drive unit to thereby travel on the ground or fly in the air.

Autonomous driving refers to a self-driving technology, and an autonomous vehicle (or self-driving vehicle) refers to a vehicle that is driven without a user's manipulation or with a user's minimal manipulation.

For example, the autonomous driving may include a technology for maintaining a driving lane, a technology for automatically adjusting speed such as adaptive cruise control, a technology for automatically driving or traveling along a predetermined route or path, and a technology for automatically setting a path to travel when a destination is set.

A vehicle includes all of a vehicle including only an internal combustion engine, a hybrid vehicle including an internal combustion engine and an electric motor, and an electric vehicle including only an electric motor, and may include not only automobiles, but also trains and motorcycles.

Here, the autonomous vehicle may be a robot having an autonomous driving function.

Extended reality collectively refers to virtual reality (VR), augmented reality (AR), and mixed reality (MR). VR technology provides real-world objects backgrounds, or the like in a CG image, AR technology provides virtually created CG images on real-world object images, and MR technology is a computer graphic technology that mixes and combines virtual objects into the real world.

The MR technology is similar to the AR technology in the sense that real-world objects and virtual objects are shown together. However, in the AR technology, a virtual object is used in the form of complementing a real-world object. On the other hand, in the MR technology, a virtual object and a real-world are used in an equal manner.

The XR technology may be applied to a head-mount display (HMD), a head-up display (HUD), a mobile phone, a tablet PC, a laptop, a desktop, a TV, digital signage, and the like, and a device that uses the XR technology may be referred to as an "XR device".

FIG. 1 illustrates an AI device according to one implementation of the present disclosure.

An AI device 100' may be configured as a fixed (or stationary) device or a movable (or mobile) device such as a TV, a projector, a mobile phone, a smartphone, a desktop computer, a notebook computer, a digital broadcasting terminal, a personal digital assistant (PDA), a portable multimedia player (PMP), a navigation device, a tablet PC, a wearable device, and a set-top box (STB), a DMB receiver, a radio, a washing machine, a refrigerator, a desktop computer, digital signage, a robot, a vehicle, and the like.

As illustrated in FIG. 1, the AI device 100' may include a communication unit 110', an input unit 120', a learning processor 130', a sensing unit 140', an output unit 150', a memory 170', and a processor 180'.

The communication unit 110' may transmit and receive data to and from external devices, such as other AI devices 100a to 100e and an AI server 200', using wired/wireless communication technologies. For example, the communication unit 110' may transmit and receive sensor information, a user input, a learning model, a control signal, and the like with the external devices.

Here, the communication unit 110' uses communication technologies including Global System for Mobile communication (GSM), Code Division Multi Access (CDMA), Long Term Evolution (LTE), 5G, Wireless LAN (WLAN), and Wireless-Fidelity (Wi-Fi), Bluetooth™ Radio Frequency Identification (RFID), Infrared Data Association (IrDA), ZigBee, Near Field Communication (NFC), and the like.

The input unit 120' may acquire various types of data.

Here, the input unit 120' may include a camera for inputting an image (or video) signal, a microphone for receiving an audio signal, and a user input unit for receiving information from a user. When the camera or the microphone is considered as a sensor, a signal obtained from the camera or the microphone may be referred to as sensing data or sensor information.

The input unit 120' may acquire training data for model training and input data to be used when acquiring an output by using a learning model. The input unit 120' may obtain unprocessed or raw input data. Here, the processor 180' or the learning processor 130' may extract an input feature as pre-processing for the input data.

The learning processor 130' may train a model that consists of an artificial neural network by using training data. Here, the trained artificial neural network may be referred to as a "learning model". The learning model may be used to infer a result value for new input data, not training data, and the inferred value may be used as a basis for determining to perform a specific operation (or action).

The learning processor 130' may perform AI processing together with a learning processor 240' of the AI server 200'.

The learning processor 130' may include a memory integrated or implemented in the AI device 100'. Alternatively, the learning processor 130' may be implemented using the memory 170', an external memory directly coupled to the AI device 100', or a memory kept in an external device.

The sensing unit 140' may use various sensors to acquire at least one of internal information of the AI device 100', surrounding environment information of the AI device 100', and user information.

The sensing unit 140' may include, for example, a proximity sensor, an illumination sensor, an acceleration sensor, a magnetic sensor, a gyroscope (or gyro) sensor, an inertial sensor, an RGB sensor, an IR sensor, a finger scan sensor, an ultrasonic sensor, an optical sensor, a microphone, a LiDAR, a radar, and the like.

The output unit 150' may generate an output related to a visual, audible, or tactile signal.

In this case, the output unit 150' may include a display module or unit for outputting visual information, a speaker for outputting auditory information, a haptic module for outputting tactile information, and the like.

The memory 170' may store data that supports various functions or features of the AI device 100'. For example, the memory 170' may store input data acquired from the input unit 120', training data, a learning model, a learning history, and the like.

The processor 180' may determine at least one executable operation of the AI device 100' based on information determined or generated using a data analysis algorithm or a machine learning algorithm. In addition, the processor 180' may control the components of the AI device 100' to perform the determined operation.

To this end, the processor 180' may request, search, receive, or utilize data of the learning processor 130' or the memory 170'. The processor 180' may control the components of the AI device 100' to perform a predicted (or expected) or desirable operation among the at least one executable operation.

When connection of an external device is required to perform the determined operation, the processor 180' may generate a control signal for controlling the external device and transmit the generated control signal to the external device.

The processor 180' may obtain intention or intent information corresponding to a user input to determine a user's requirement (or request) based on the obtained intent information.

Here, the processor 180' may obtain intent information corresponding to the user input by using at least one of a Speech to Text (STT) engine for converting a voice or audio input into a text string and a natural language processing (NLP) engine for obtaining intent information of a natural language.

At least one of the STT engine and the NLP engine may, at least partially, consist of an artificial neural network trained according to a machine learning algorithm. In addition, at least one of the STT engine and the NLP engine may be trained by the learning processor 130', trained by the learning processor 240 of the AI server 200', or trained by distributed processing thereof.

The processor 180' may collect history information including operation contents of the AI device 100' or user's feedback on an operation of the AI device 100', and store the history information in the memory 170' or the learning processor 130', or transmit the history information to an external device such as the AI server 200'. The collected history information may be used to update a learning model.

The processor 180' may control at least some of the components of the AI device 100' to run an application program stored in the memory 170'. Further, the processor 180' may operate two or more components included in the AI device 100' in combination to execute the application program.

Figure 2:
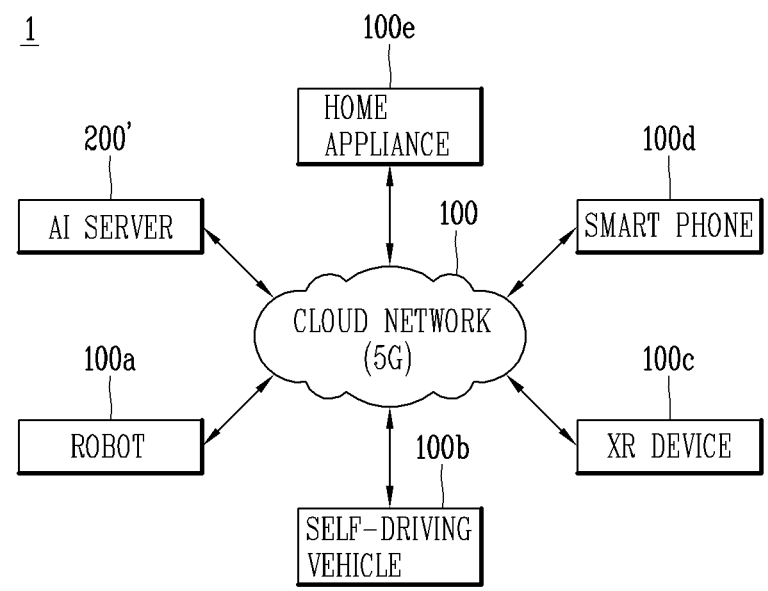
FIG. 2 illustrates an AI server according to one implementation of the present disclosure.

FIG. 2 illustrates an AI server according to one implementation of the present disclosure.

Referring to FIG. 2, the ' may refer to a device that trains an artificial neural network using a machine learning algorithm or uses a trained artificial neural network. Here, the AI server 200' may include a plurality of servers to perform distributed processing, or be defined as a 5G network. In this case, the AI server 200' may be included as a partial configuration of the AI device 100', so as to perform at least part of AI processing together.

The AI server 200' may include a communication unit 210', a memory 230', a learning processor 240', a processor 260', and the like.

The communication unit 210' may transmit and receive data with an external device such as the AI device 100'.

The memory 230' may include a model storage unit 231'. The model storage unit 231' may store a model (or artificial neural network 231*a*') that is being trained or has been trained by the learning processor 240'.

The learning processor 240' may train the artificial neural network 231*a*' using training data. A learning model may be used in a state of being installed on the AI server 200' of an artificial neural network, or may be installed on an external device such as the AI device 100'.

The learning model may be implemented as hardware, software, or a combination thereof. When some or the entire of the learning model is implemented as software, one or more instructions constructing the learning model may be stored in the memory 230'.

The processor 260' may infer a result value for new input data using the learning model, and generate a response or a control command based on the inferred result value.

FIG. 3 illustrates an AI system according to one implementation of the present disclosure.

Referring to FIG. 3, in an AI system 1, at least one of the AI server 200', a robot 100*a*, an autonomous vehicle (or self-driving vehicle) 100*b*, an XR device 100*c*, a smartphone 100*d*, and a home appliance 100*e* is connected to a cloud network 10. Here, the robot 100*a*, the autonomous vehicle 100*b*, the XR device 100*c*, the smartphone 100*d*, and the home appliance 100*e* to which the AI technology is applied may be referred to as "AI devices" 100*a* to 100*e*.

The cloud network 10 may be a network that constitutes a part of a cloud computing infrastructure or exists in the cloud computing infrastructure. Here, the cloud network 10 may be constructed using a 3G network, a 4G or LTE network, and/or a 5G network.

That is, the devices (100*a* to 100*e*, 200') constituting the AI system 1 may be connected to each other through the cloud network 10. In particular, the devices 100*a* to 100*e* and 200' may communicate with each other through a base station, or may directly communicate with each other without through the base station.

The AI server 200' may include a server for performing AI processing and a server for performing calculation on big data.

The AI server 200' may be connected to at least one of the robot 100*a*, the autonomous vehicle 100*b*, the XR device 100*c*, the smartphone 100*d*, and the home appliance 100*e*, which are the AI devices constituting the AI system 1, through the cloud network 10, and may help at least part of the AI processing of the connected AI devices 100*a* to 100*e*.

Here, the AI server 200' may train an artificial neural network according to a machine learning algorithm in place of the AI devices 100*a* to 100*e*, and may directly store a learning model or transmit the learning model to the AI devices 100*a* to 100*e*.

At this time, the AI server 200' may receive input data from the AI devices 100*a* to 100*e*, infer a result value of the received input data using the learning model, generate a response or a control command based on the inferred result value, and transmit the generated response or control command to the AI devices 100*a* to 100*e*.

Alternatively, the AI devices 100*a* to 100*e* may directly infer a result value from input data using a learning model, and generate a response or a control command based on the inferred result value.

Hereinafter, various implementations of the AI devices 100*a* to 100*e* to which the above-described technologies are applied will be described. Here, the AI devices 100*a* to 100*e* illustrated in FIG. 3 may be a specific example of the AI device 100' shown in FIG. 1.

As an AI technology is applied to the robot 100*a*, the robot 100*a* may be implemented as a guide robot, a transport robot, a cleaning robot, a wearable robot, an entertainment robot, a pet robot, an unmanned flying robot, and the like.

The robot 100a may include a robot control module for controlling an operation, and the robot control module may refer to a software module or a chip which is a hardware implementation of the software module.

The robot 100a may acquire state or status information of the robot 100a, detect (recognize) a surrounding environment and objects, generate map data, determine a travel path (or route) and a driving plan, provide a response to user interaction, or determine an operation using sensor information obtained from various types of sensors.

Here, the robot 100a may use sensor information obtained by at least one sensor from a LiDAR, a radar, and a camera in order to determine a travel path and a driving plan.

The robot 100a may perform the operations described above using a learning model that consists of at least one artificial neural network. For example, the robot 100a may recognize a surrounding environment and objects using a learning model and determine an operation using recognized surrounding environment or object information. Here, the learning model may have been directly trained in the robot 100a or have been trained in an external device such as the AI server 200'.

Here, the robot 100a may directly generate a result using the learning model to perform an operation, or perform an operation by transmitting sensor information to an external device such as the AI server 200' and receiving a result generated accordingly.

The robot 100a may determine a travel path and a driving plan by using at least one of object information acquired from map data, object information detected from sensor information, or object information obtained from an external device, and control the drive unit such that the robot 100a travels according to the determined travel path and driving plan.

The map data may include object identification information regarding various objects located in a space in which the robot 100a travels. For example, the map data may include object identification information regarding fixed objects such as a wall and a door, and movable objects such as a flower pot and a desk. In addition, the object identification information may include a name, a type, a distance, a location (or position), and the like.

In addition, the robot 100a may perform an operation or travel by controlling the drive unit based on user's control/interaction. Here, the robot 100a may acquire intention information of an interaction according to a user's motion or voice (speech), determine a response based on the obtained intention information, and perform an operation.

As an AI technology is employed in the autonomous vehicle 100b, the autonomous vehicle 100b may be implemented as a mobile robot, vehicle, or unmanned aerial vehicle.

The autonomous vehicle 100b may include an autonomous driving control module for controlling an autonomous driving function, and the autonomous driving control module may refer to a software module or a chip which is a hardware implementation of the software. The autonomous driving control module may be included in the autonomous driving vehicle 100b, or may be configured as separate hardware provided outside the autonomous vehicle 100b to be connected thereto.

The autonomous driving vehicle 100b may use sensor information obtained from various types of sensors to obtain state information of the autonomous vehicle 100b, detect (recognize) a surrounding environment and objects, generate map data, determine a travel path and a driving plan, or to determine an operation.

Like the robot 100a, the autonomous vehicle 100b may use sensor information obtained from at least one sensor among a LiDAR, a radar, and a camera to determine a travel path and a driving plan.

In particular, the autonomous vehicle 100b may recognize an environment or an object in an area where the field of view is blocked or an area greater than or equal to a specific distance by receiving sensor information from external devices or by receiving directly recognized information from the external devices.

The autonomous vehicle 100b may perform the above-described operations using a learning model consisting of at least one artificial neural network. For example, the autonomous vehicle 100b may recognize a surrounding environment and objects using a learning model, and may determine the flow of driving using recognized surrounding environment information or object information. Here, the learning model may have been directly trained in the autonomous vehicle 100b or trained in an external device such as the AI server 200'.

Here, the autonomous vehicle 100b may directly generate a result using the learning model to perform an operation, or may perform an operation by transmitting sensor information to an external device such as the AI server 200' and receiving the result generated accordingly.

The autonomous vehicle 100b may use at least one of map data, object information detected from sensor information, and object information obtained from an external device to determine a travel path and a driving plan, and control the drive unit such that the autonomous vehicle 100b travels according to the determined travel path and driving plan.

The map data may include object identification information regarding various objects located in a space (e.g., a road) in which the autonomous vehicle 100b travels. For example, the map data may include object identification information regarding fixed objects such as a streetlight, a rock, and a building, and movable objects such as a vehicle and a pedestrian. In addition, the object identification information may include a name, a type, a distance, a location and the like.

Further, the autonomous vehicle 100b may perform an operation or travel by controlling the drive unit based on user's control/interaction. In this case, the autonomous vehicle 100b may obtain intention information of an interaction according a user's motion or voice (speech), determine a response based on the acquired intention information, and perform an operation.

As an AI technology is applied to the XR device 100c, the XR device 100c may be implemented as a Head-Mount Display (HIVID), a Head-Up Display (HUD) provided in a vehicle, a TV, a mobile phone, a smartphone, a computer, a wearable device, a home appliance, digital signage, a vehicle, a stationary robot, and a mobile (or moving) robot.

The XR device 100c may analyze 3D point cloud data or image data acquired through various sensors or from an external device, generate location data and attribute data for 3D points, obtain information regarding a surrounding space or real-world objects, and render an XR object to output. For example, the XR device 100c may output an XR object including additional information regarding a recognized object in corresponding to the recognized object.

The XR device 100c may perform the above-described operations using a learning model consisting of at least one artificial neural network. For example, the XR device 100c may recognize a real-world object in 3D point cloud data or image data using a learning model, and may provide information corresponding to the recognized real-world object. Here, the learning model may have been directly trained in the XR device 100c or may have been trained in an external device such as the AI server 200'.

Here, the XR device 100c may directly generate a result using a learning model to perform an operation, or may perform an operation by transmitting sensor information to an external device such as the AI server 200' and receiving a result generated accordingly.

As an AI technology and autonomous driving technology are applied to the robot 100a, the robot 100a may be implemented as a guide robot, a transport robot, a cleaning robot, a wearable robot, an entertainment robot, a pet robot, an unmanned flying robot, etc.

The robot 100a to which the AI technology and autonomous driving technology are applied may be a robot itself having an autonomous driving function or a robot 100a interacting with the autonomous vehicle 100b.

The robot 100a having the autonomous driving function may collectively refer to devices that travel by themselves according to a given traffic flow without the user's control or by determining a traffic flow to travel by themselves.

The robot 100a having an autonomous driving function and the autonomous driving vehicle 100b may use a common sensing technique to determine one or more of a travel path and a driving plan. For example, the robot 100a having an autonomous driving function and the autonomous vehicle 100b may determine one or more of a travel path and a driving plan using information sensed through a LiDAR, a radar, and a camera.

The robot 100a interacting with the autonomous vehicle 100b may exist separately or independently from the autonomous vehicle 100b, and perform an operation linked to an autonomous driving function at the inside or outside of the autonomous vehicle 100b or perform an operation associated with a user on board the autonomous vehicle 100b.

Here, the robot 100a interacting with the autonomous vehicle 100b may obtain sensor information on behalf of the autonomous vehicle 100b and provide it to the autonomous vehicle 100b, or acquire sensor information and generate surrounding environment information or object information to provide them to the autonomous vehicle 100b, to thereby control or assist the autonomous driving function of the autonomous vehicle 100b.

Alternatively, the robot 100a interacting with the autonomous vehicle 100b may monitor a user on board the autonomous vehicle 100b or control functions of the autonomous vehicle 100b through an interaction with a user. For example, when it is determined that the driver is in drowsy state, the robot 100a may activate an autonomous driving function of the autonomous vehicle 100b or assist control the drive unit of the autonomous vehicle 100b. Here, the functions of the autonomous vehicle 100b controlled by the robot 100a may include not only the autonomous driving function, but also a function provided by a navigation system or an audio system provided in the autonomous vehicle 100b.

Alternatively, the robot 100a interacting with the autonomous driving vehicle 100b may provide information to the autonomous vehicle 100b or assist a function from the outside of the autonomous vehicle 100b. For example, the robot 100a may provide the autonomous vehicle 100b with traffic information including signal information as in smart traffic lights, or automatically connect an automatic electric charger to a charging port through an interaction with the autonomous vehicle 100b as in an automatic electric charger of an electric vehicle.

As an AI technology and an XR technology are applied to the robot 100a, the robot 100a may be implemented as a guide robot, a transport robot, a cleaning robot, a wearable robot, an entertainment robot, a pet robot, an unmanned flying robot, a drone, etc.

The robot 100a to which the XR technology is applied may refer to a robot that is a target of control/interaction in an XR image. In this case, the robot 100a is distinguished or different from the XR device 100c, and they may be interlocked with each other.

When the robot 100a, which is a target of control/interaction in an XR image, acquires sensor information from sensors including a camera, the robot 100a or the XR device 100c may generate an XR image based on the sensor information, and the XR device 100c may output the generated XR image. In addition, the robot 100a may operate based on a control signal input through the XR device 100c or a user's interaction.

For example, a user may check or identify an XR image corresponding to the viewpoint of the robot 100a remotely linked through an external device such as the XR device 100c, adjust an autonomous driving path of the robot 100a through an interaction, control an operation or driving, or check information of surrounding objects.

As an AI technology and an XR technology is applied to the autonomous vehicle 100b, the autonomous vehicle 100b may be implemented as a mobile robot, a vehicle, or an unmanned aerial vehicle, etc.

The autonomous vehicle 100b to which the XR technology is applied may refer to an autonomous vehicle including means for providing an XR image, or an autonomous driving vehicle that is a target of control/interaction in an XR image. In particular, the autonomous vehicle 100b, which a target of control/interaction in an XR image, is distinguished from the XR device 100c, and they may be interlocked with each other.

The autonomous vehicle 100b equipped with means for providing an XR image may obtain sensor information from sensors including a camera, and may output an XR image generated based on the obtained sensor information. For example, the autonomous vehicle 100b may include a HUD to provide an occupant on board with an XR object corresponding to a real-world object or an object in a screen by outputting an XR image.

Here, when the XR object is output to the HUD, at least a part of the XR object may be overlaid or superimposed on a real-world object at which the occupant's gaze is directed. On the other hand, when the XR object is displayed on a display provided in the autonomous vehicle 100b, at least a part of the XR object may be overlaid on an object in a screen. For example, the autonomous vehicle 100b may output XR objects corresponding to objects such as lanes, other vehicles, traffic lights, traffic signs, two-wheeled vehicles, pedestrians, and buildings.

When the autonomous vehicle 100b, which is a target of control/interaction in an XR image, acquires sensor information from sensors including a camera, the autonomous vehicle 100b or the XR device 100c may generate an XR image based on the sensor information, and the XR device 100c may output the generated XR image. In addition, autonomous vehicle 100b may operate based on a control signal input through an external device such as the XR device 100c or a user's interaction.

The vehicle disclosed herein may include any of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving or traveling direction of the vehicle, and a right side of the vehicle refers to a right side in the driving direction.

FIG. 4 illustrates an outer appearance of a vehicle according to an implementation of the present disclosure.

Figure 5:
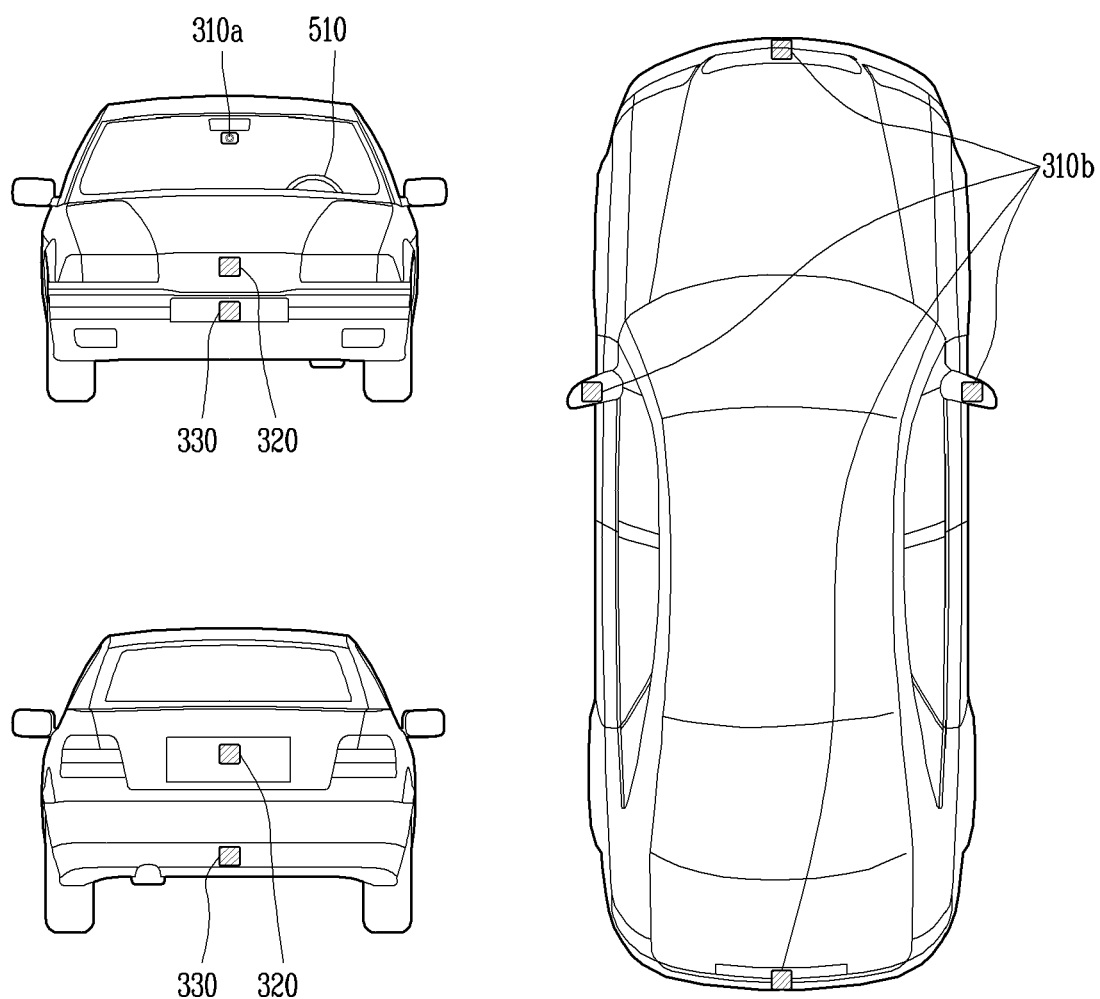
FIG. 5 illustrates a vehicle exterior from various angles according to an implementation of the present disclosure.

FIG. 5 illustrates a vehicle exterior from various angles according to an implementation of the present disclosure.

Figure 6:
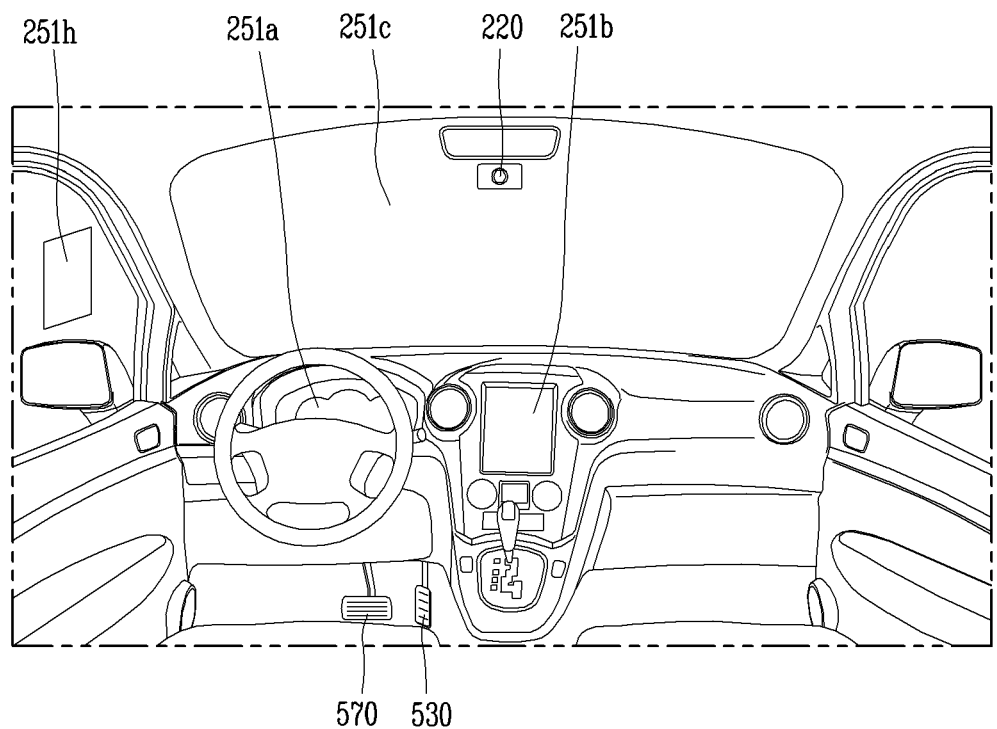
FIGS. 6 and 7 illustrate a vehicle interior according to an implementation of the present disclosure.
Figure 7:
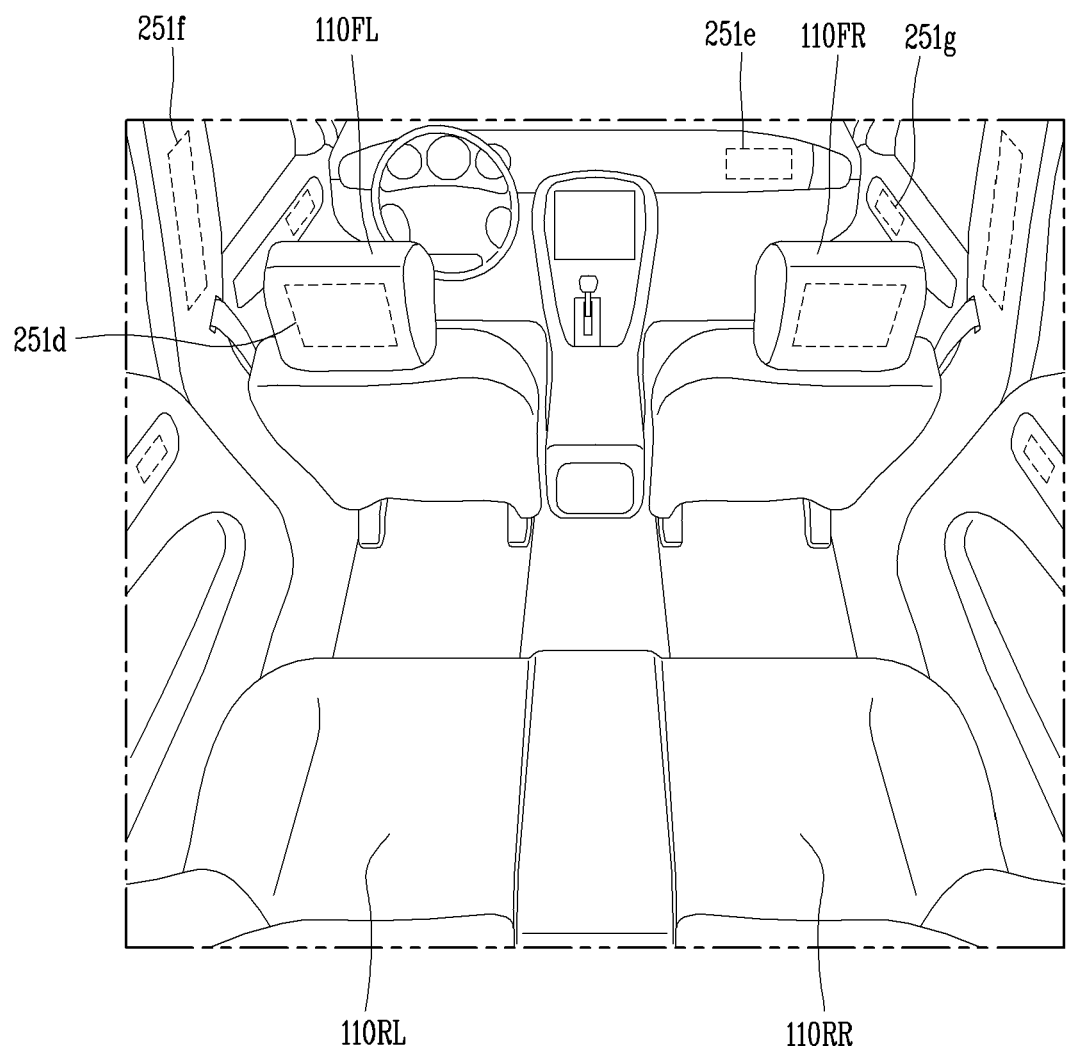

FIGS. 6 and 7 illustrate a vehicle interior according to an implementation of the present disclosure.

Figure 8:
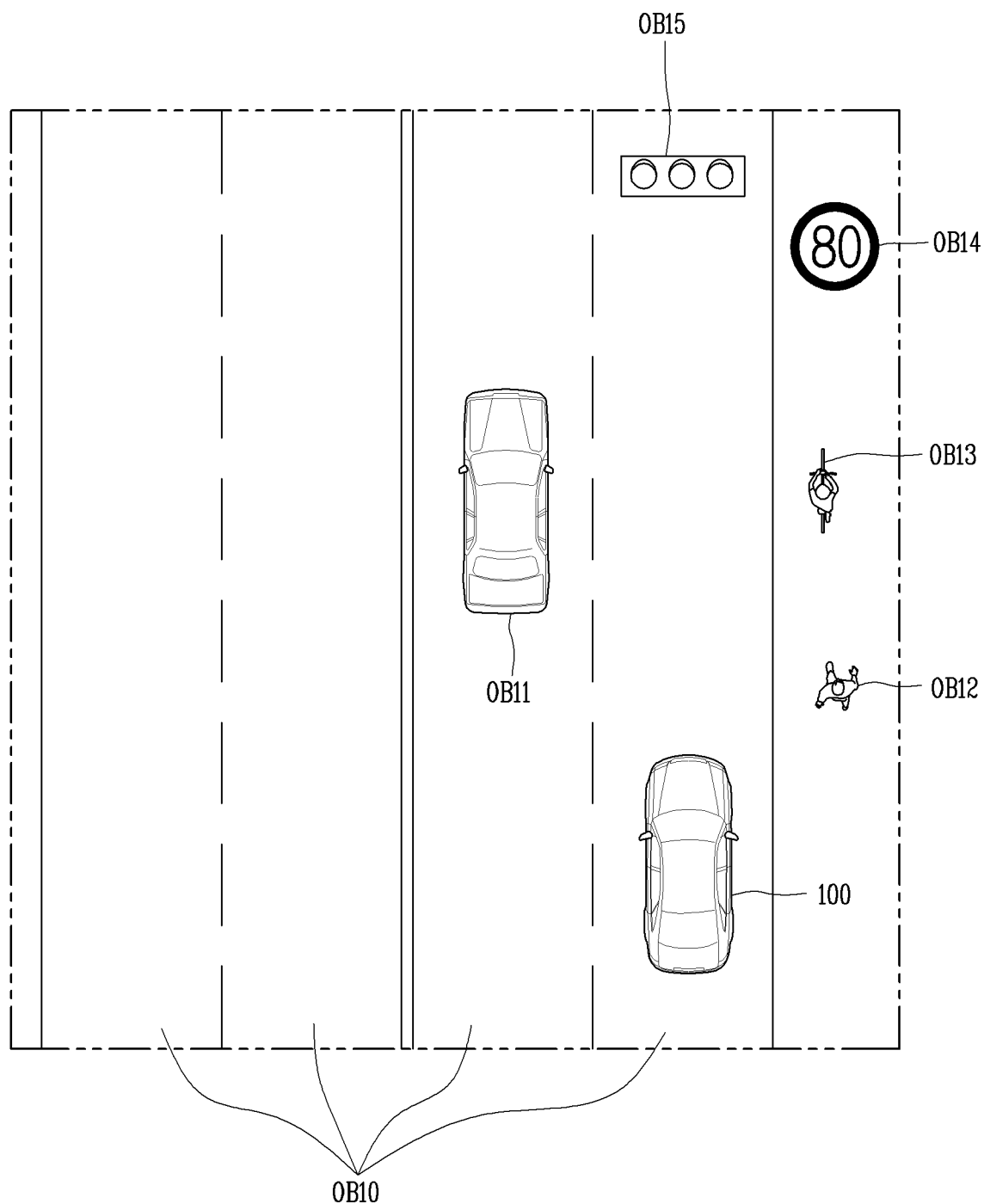
FIGS. 8 and 9 are views referenced to describe objects according to an implementation of the present disclosure.
Figure 9:
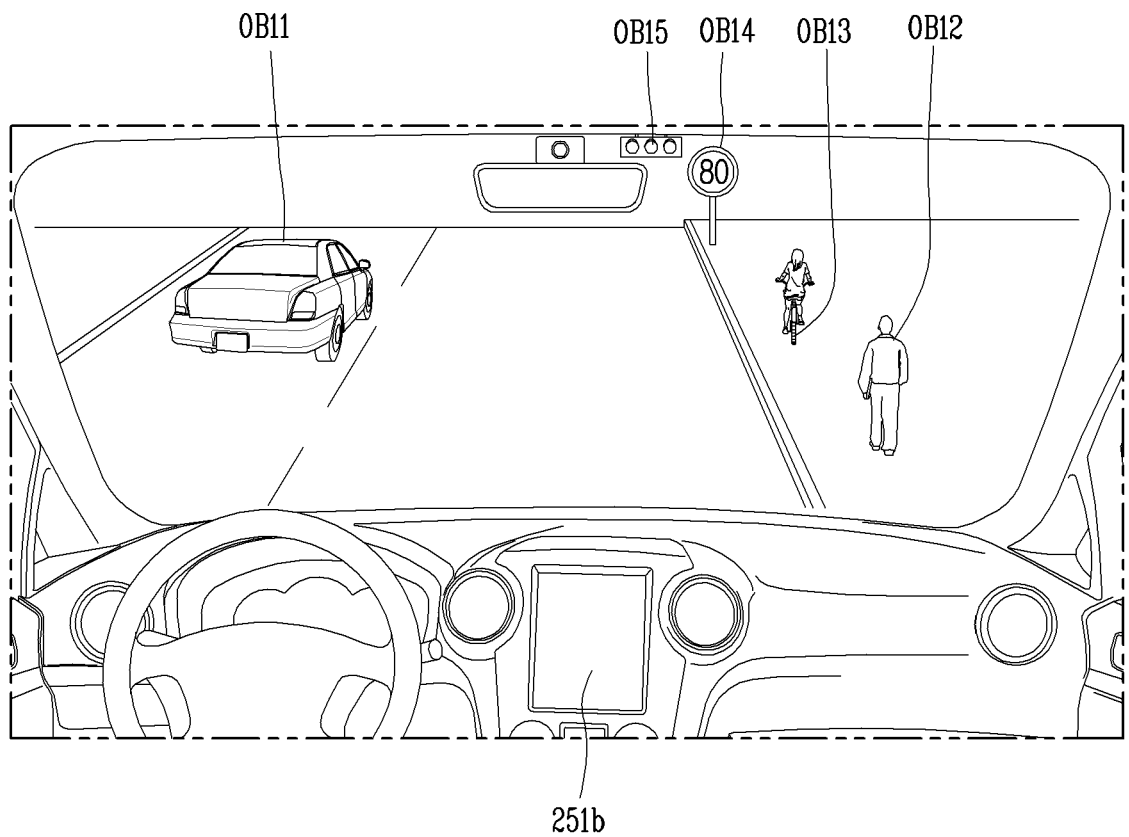

FIGS. 8 and 9 are views referenced to describe objects according to an implementation of the present disclosure.

Figure 10:
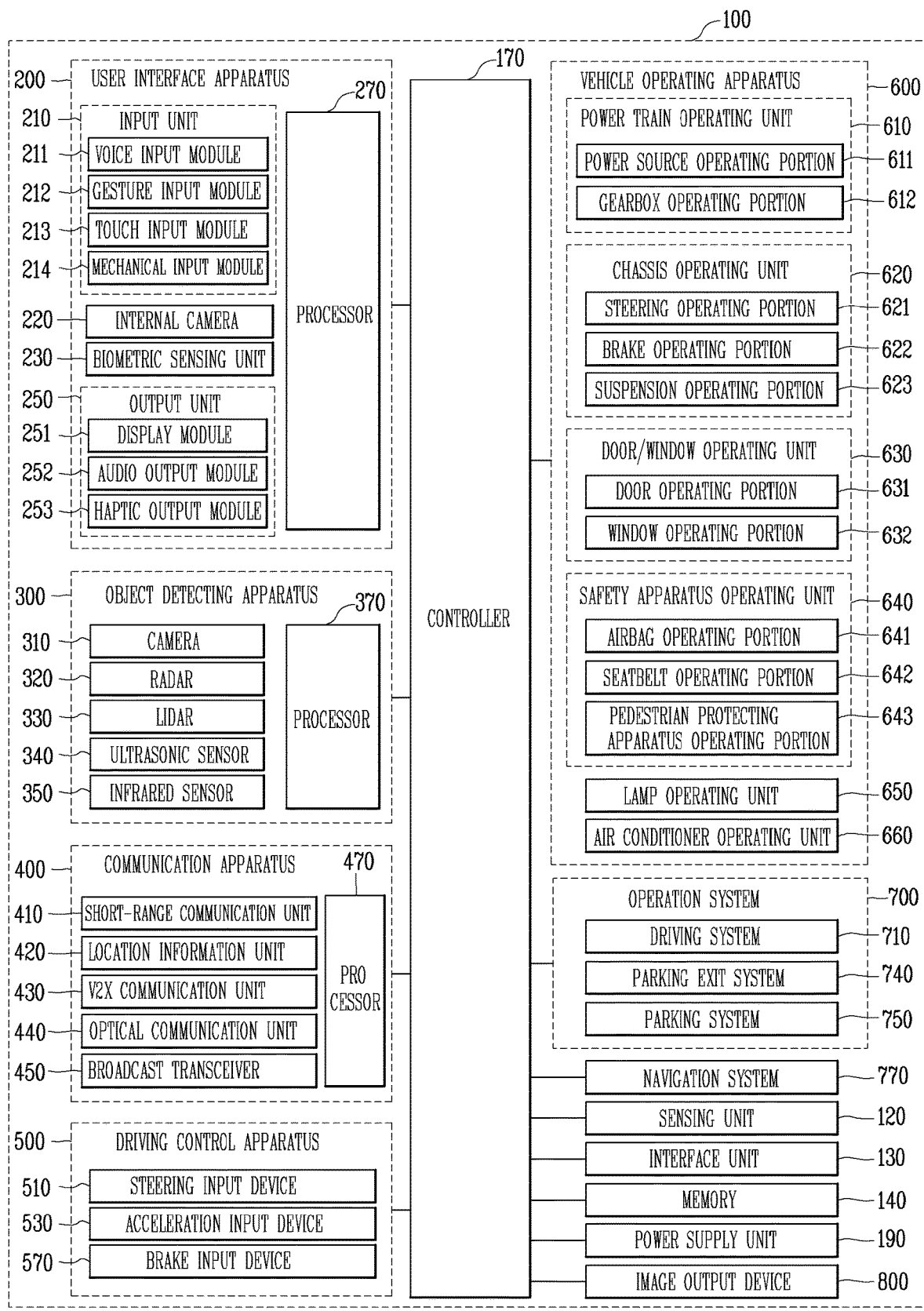
FIG. 10 is a block diagram illustrating a vehicle according to an implementation of the present disclosure.

FIG. 10 is a block diagram illustrating a vehicle according to an implementation of the present disclosure.

As illustrated in FIGS. 4 to 10, a vehicle 100 may include wheels turning by a driving force, and a steering input device 510 for adjusting a driving (preceding, moving) direction of the vehicle 100.

The vehicle 100 may be an autonomous vehicle.

Here, the autonomous driving is defined as controlling at least one of acceleration, deceleration, and driving direction based on a preset algorithm. In other words, the autonomous driving refers to that a driving control apparatus is automatically manipulated even without a user input applied to the driving control apparatus.

The vehicle 100 may be switched into an autonomous mode or a manual mode based on a user input.

For example, the vehicle 100 may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

For instance, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740, and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 10, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a control unit 170, and a power supply unit 190.

In some implementations, the vehicle 100 may include more components in addition to components described in this specification or may exclude one or more of the components described herein.

The user interface apparatus 200 is an apparatus for communication between the vehicle 100 and a user. The user interface apparatus 200 may receive a user input and provide information generated in the vehicle 100 to the user. The vehicle 100 may implement user interfaces (UIs) or user experiences (UXs) through the user interface apparatus 200.

The user interface apparatus 200 may include an input unit 210, an internal camera 220, a biometric sensing unit 230, an output unit 250, and a controller (or processor) 270.

According to some implementations, the user interface apparatus 200 may include more components in addition to the components described in this specification or may not include some of those components described herein.

The input unit 210 may allow the user to input information. Data collected in the input unit 210 may be analyzed by the controller 270 and processed as a user's control command.

The input unit 210 may be disposed inside the vehicle. For example, the input unit 210 may be disposed on one area of a steering wheel, one area of an instrument panel, one area of a seat, one area of each pillar, one area of a door, one area of a center console, one area of a headlining, one area of a sun visor, one area of a wind shield, one area of a window, or other suitable areas in the vehicle.

The input unit 210 may include an audio (or voice) input module 211, a gesture input module 212, a touch input module 213, and a mechanical input module 214.

The audio input module 211 may convert a user's voice input into an electric signal. The converted electric signal may be provided to the controller 270 or the control unit 170.

The audio input module 211 may include at least one microphone.

The gesture input module 212 may convert a user's gesture input into an electric signal. The converted electric signal may be provided to the controller 270 or the control unit 170.

The gesture input module 212 may include at least one of an infrared sensor and an image sensor for detecting the user's gesture input.

According to some implementations, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to controller 270 or the control unit 170.

The touch input module 213 may include a touch sensor for detecting the user's touch input.

In some implementations, the touch input module 213 may be integrated with a display module 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the controller 270 or the control unit 170.

The mechanical input module 214 may be arranged on a steering wheel, a center fascia, a center console, a cockpit module, a door, and/or other suitable areas in the vehicle.

The internal camera 220 may acquire an internal image of the vehicle. The controller 270 may detect a user's state based on the internal image of the vehicle. The controller 270 may acquire information related to the user's gaze from the internal image of the vehicle. The controller 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible, or tactile signal.

The output unit 250 may include at least one of a display module 251, an audio output module 252, and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display, and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 may convert an electric signal provided from the controller 270 or the control unit 170 into an audio signal for output. To this end, the audio output module 252 may include at least one speaker.

The haptic output module 253 may generate a tactile output. For example, the haptic output module 253 may vibrate the steering wheel, a safety belt, a seat 110FL, 110FR, 110RL, 110RR such that the user can recognize such output.

The controller 270 may control an overall operation of each unit of the user interface apparatus 200.

According to some implementations, the user interface apparatus 200 may include a plurality of controllers 270 or may not include the controller 270.

When the controller 270 is not included in the user interface apparatus 200, the user interface apparatus 200 may operate according to a control of a controller of another apparatus within the vehicle 100 or the control unit 170.

The user interface apparatus 200 may also be referred to herein as a display apparatus for vehicle.

The user interface apparatus 200 may operate according to the control of the control unit 170.

The object detecting apparatus 300 is an apparatus for detecting an object located at outside of the vehicle 100.

The object may be a variety of objects associated with driving or operation of the vehicle 100.

Referring to FIGS. 8 and 9, an object O may include traffic lanes OB10, another vehicle OB11, a pedestrian OB12, a two-wheeled vehicle OB13, traffic signals OB14 and OB15, light, a road, a structure, a speed hump, a terrain, an animal, and the like.

The lane OB10 may be a driving lane, a lane next to the driving lane or a lane on which another vehicle comes in an opposite direction to the vehicle 100. Each lane OB10 may include left and right lines forming the lane.

The another vehicle OB11 may be a vehicle which is moving near the vehicle 100. The another vehicle OB11 may be a vehicle located within a predetermined distance from the vehicle 100. For example, the another vehicle OB11 may be a vehicle moving ahead of or behind the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB12 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14, and a pattern or text drawn on a road surface.

The light may be light emitted from a lamp provided on another vehicle. The light may be light generated from a streetlamp. The light may be solar light.

The road may include a road surface, a curve, an upward slope, a downward slope, and the like.

The structure may be an object that is located near a road and fixed on the ground. For example, the structure may include a streetlamp, a roadside tree, a building, an electric pole, a traffic light, a bridge, and the like.

The terrain may include a mountain, a hill, and the like.

In some implementations, objects may be classified into a moving object and a fixed object. For example, the moving object may be a concept including another vehicle and a pedestrian. The fixed object may include, for example, a traffic signal, a road, or a structure.

The object detecting apparatus 300 may include a camera 310, a radar 320, a LiDAR 330, an ultrasonic sensor 340, an infrared sensor 350, and a controller (or processor) 370.

According to some implementations, the object detecting apparatus 300 may further include other components in addition to the components described herein, or may not include some of the components described herein.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

In some implementations, the camera 310 may be disposed adjacent to a front windshield within the vehicle to acquire a front image of the vehicle. Alternatively, the camera 310 may be disposed adjacent to a front bumper or a radiator grill.

Alternatively, the camera 310 may be disposed adjacent to a rear glass within the vehicle to acquire a rear image of the vehicle. Alternatively, the camera 310 may be disposed adjacent to a rear bumper, a trunk or a tail gate.

Alternatively, the camera 310 may be disposed adjacent to at least one of side windows within the vehicle to acquire a side image of the vehicle. Alternatively, the camera 310 may be disposed adjacent to a side mirror, a fender or a door.

The camera 310 may provide an acquired image to the controller 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keying (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear, or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear, or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object, and a relative speed with the detected object.

The ultrasonic sensor 340 may be disposed on an appropriate position outside the vehicle for detecting an object located at the front, rear, or side of the vehicle.

The infrared sensor 350 may include infrared light transmitting and receiving portions. The infrared sensor 350 may detect an object based on infrared light, and detect a position of the detected object, a distance from the detected object, and a relative speed with the detected object.

The infrared sensor 350 may be disposed on an appropriate position outside the vehicle for detecting an object located at the front, rear, or side of the vehicle.

The controller 370 may control an overall operation of each unit of the object detecting apparatus 300.

The controller 370 may detect an object based on an acquired image, and track the object. The controller 370 may execute operations, such as a calculation of a distance from the object, a calculation of a relative speed with the object and the like, through an image processing algorithm.

The controller 370 may detect an object based on a reflected electromagnetic wave, which is generated when an emitted electromagnetic wave is reflected from the object, and track the object. The controller 370 may execute operations, such as a calculation of a distance from the object, a calculation of a relative speed with the object and the like, based on the reflected electromagnetic wave.

The controller 370 may detect an object based on a reflected laser beam, which is generated when an emitted laser beam is reflected from the object, and track the object. The controller 370 may execute operations, such as a calculation of a distance from the object, a calculation of a relative speed with the object and the like, based on the reflected laser beam.

The controller 370 may detect an object based on a reflected ultrasonic wave, which is generated when an emitted ultrasonic wave is reflected from the object, and track the object. The controller 370 may execute operations, such as a calculation of a distance from the object, a calculation of a relative speed with the object and the like, based on the reflected ultrasonic wave.

The controller 370 may detect an object based on reflected infrared light, which is generated when emitted infrared light is reflected from the object, and track the object. The controller 370 may execute operations, such as a calculation of a distance from the object, a calculation of a relative speed with the object and the like, based on the reflected infrared light.

In some implementations, the object detecting apparatus 300 may include a plurality of controllers 370 or may not include the controller 370. For example, each of the camera 310, the radar 320, the LiDAR 330, the ultrasonic sensor 340 and the infrared sensor 350 may include a controller in an individual manner.

When the controller 370 is not included in the object detecting apparatus 300, the object detecting apparatus 300 may operate according to the control of a controller of an apparatus within the vehicle 100 or the control unit 170.

The object detecting apparatus 300 may operate according to the control of the control unit 170.

The communication apparatus 400 is an apparatus for performing communication with an external device. Here, the external device may be another vehicle, a mobile terminal or a server. The communication apparatus 400 may be referred to as a 'wireless communication unit'.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450, and a controller (or processor) 470.

In some implementations, the communication apparatus 400 may further include other components in addition to the components described herein, or may not include some of the components described herein.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

In some implementations, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The controller 470 may control an overall operation of each unit of the communication apparatus 400.

According to some implementations, the communication apparatus 400 may include a plurality of controllers 470 or may not include the controller 470.

When the controller 470 is not included in the communication apparatus 400, the communication apparatus 400 may operate according to the control of a controller of another device within the vehicle 100 or the control unit 170.

In some implementations, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the control unit 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530, and a brake input device 570.

The steering input device 510 may receive an input regarding a driving (proceeding) direction of the vehicle 100 from the user. The steering input device 510 may be configured in the form of a wheel allowing a steering input in a rotating manner. In some implementations, the steering input device 510 may be configured as a touch screen, a touch pad, or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. In some implementations, the acceleration input device 530 or the brake input device 570 may be configured as a touch screen, a touch pad, or a button.

The driving control apparatus 500 may operate according to the control of the control unit 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some implementations, the vehicle operating apparatus 600 may further include other components in addition to the components described herein, or may not include some of the components described herein.

In some implementations, the vehicle operating apparatus 600 may include a controller. Each unit of the vehicle operating apparatus 600 may individually include a controller.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the control unit 170.

For example, upon using an electric energy-based motor as the power source, the power source operating portion 611 may perform a control for the motor. The power source operating portion 611 may adjust a rotating speed, a torque and the like of the motor according to the control of the control unit 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N), or parking (P).

For example, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622, and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

In some implementations, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

In some implementations, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, and 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a controller. Each unit of the vehicle operating apparatus 600 may individually include a controller.

The vehicle operating apparatus 600 may operate according to the control of the control unit 170.

The operation system 700 is a system that controls various driving modes of the vehicle 100. The operation system 700 may operate in an autonomous driving mode.

The operation system 700 may include a driving system 710, a parking exit system 740, and a parking system 750.

In some implementations, the operation system 700 may further include other components in addition to the components described herein, or may not include some of the components described herein.

In some implementations, the operation system 700 may include at least one controller. Each unit of the operation system 700 may individually include at least one controller.

In some implementations, the operation system may be implemented by the control unit 170 when it is implemented in a software configuration.

In some implementations, the operation system 700 may be implemented by at least one of the user interface apparatus 200, the object detecting apparatus 300, the communication apparatus 400, the vehicle operating apparatus 600, and the control unit 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600, and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, and transmit a control signal to the vehicle operating apparatus 600 to park the vehicle 100.

The parking system 750 may receive object information from the object detecting apparatus 300, and transmit a control signal to the vehicle operating apparatus 600 to park the vehicle 100.

The parking system 750 may receive a signal from an external device through the communication apparatus 400, and transmit a control signal to the vehicle operating apparatus 600 to park the vehicle 100.

The navigation system 770 may provide navigation information. The navigation information may include at least one of map information, information regarding a set destination, path information according to the set destination, information regarding various objects on a path, lane information and current location information of the vehicle 100.

The navigation system 770 may include a memory and a controller. The memory may store the navigation information. The controller may control an operation of the navigation system 770.

In some implementations, the navigation system 770 may update prestored information by receiving information from an external device through the communication apparatus 400.

In some implementations, the navigation system 770 may be classified as a sub component of the user interface apparatus 200.

The sensing unit 120 may detect a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal, and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

In some implementations, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the control unit 170.

The memory 140 is electrically connected to the control unit 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the control unit 170.

In some implementations, the memory 140 may be integrated with the control unit 170 or implemented as a sub component of the control unit 170.

The control unit 170 may control an overall operation of each unit of the vehicle 100. The control unit 170 may be referred to as an Electronic Control Unit (ECU).

The power supply unit 190 may supply power required for an operation of each component according to the control of the control unit 170. Specifically, the power supply unit 190 may receive power supplied from an internal battery of the vehicle, and the like.

At least one control unit 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Hereinafter, an image output device 800 provided in the vehicle 100 will be described in detail.

The image output device 800, which is provided in the vehicle 100 may be implemented as an independent device detachable from the vehicle 100 or as a part of the vehicle 100 which is integrally installed in the vehicle 100.

All the operation and control method of the image output device 800 described in this specification may be alternatively performed by the control unit 170 of the vehicle 100. That is, the operation and/or control method performed by a controller 870 of the image output device 800 may be performed by the control unit 170 of the vehicle 100.

Figure 11:
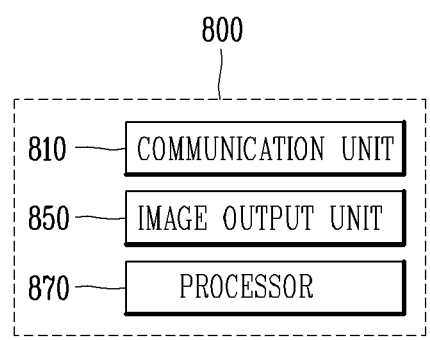
FIG. 11 is a conceptual diagram illustrating an image output device according to one implementation of the present disclosure.

Referring to FIG. 11, the image output device 800 includes a communication unit 810, an image output unit 850, and a controller (or processor) 870.

The communication unit 810 is configured to perform communication with the various components described in FIG. 10. For example, the communication unit 810 may receive various information provided through a controller area network (CAN). In another example, the communication unit 810 may communicate with all devices capable of performing communication, such as a vehicle, a mobile terminal, a server, and another vehicle. This may be referred to as Vehicle to everything (V2X) communication. The V2X communication may be defined as a technology of exchanging or sharing information, such as traffic condition and the like, while communicating with a road infrastructure and other vehicles during driving.

The communication unit 810 may be configured to perform communication with one or more devices provided in the vehicle 100. The communication unit 810 may include a beam former and a radio frequency IC (RFIC) that controls the beam former to enable 5G communication at a frequency band of 6 GHz or higher. However, when 5G communication uses a frequency band of 6 GHz or less, the communication unit 810 may not necessarily include the beam former and the RFIC.

The communication unit 810 may receive information related to driving of the vehicle 100 from most of the devices provided in the vehicle 100. The information transmitted from the vehicle 100 to the image output device 800 is referred to as 'vehicle driving information (or vehicle travel information)'.

Vehicle driving information includes vehicle information and surrounding information related to the vehicle. Information related to the inside of the vehicle with respect to the frame of the vehicle 100 may be defined as the vehicle information, and information related to the outside of the vehicle may be defined as the surrounding information.

The vehicle information refers to information related to the vehicle itself. For example, the vehicle information may include a driving speed, a driving direction, an acceleration, an angular velocity, a location (GPS), a weight, a number of passengers in the vehicle, a braking force of the vehicle, a maximum braking force, air pressure of each wheel, a centrifugal force applied to the vehicle, a driving mode of the vehicle (autonomous driving mode or manual driving mode), a parking mode of the vehicle (autonomous parting mode, automatic parking mode, manual parking mode), whether or not a user is present in the vehicle, and information associated with the user.

The surrounding information refers to information related to another object located within a predetermined range around the vehicle, and information related to the outside of the vehicle. The surrounding information of the vehicle may be a state of a road surface on which the vehicle is traveling (e.g., a frictional force), the weather, a distance from a preceding (succeeding) vehicle, a relative speed of a preceding (or succeeding) vehicle, a curvature of a curve when a driving lane is the curve, information associated with an object existing in a reference region (predetermined region) based on the vehicle, whether or not an object enters (or leaves) the predetermined region, whether or not the user exists near the vehicle, information associated with the user (e.g., whether or not the user is an authenticated user), and the like.

The surrounding information may also include ambient brightness, temperature, a position of the sun, information related to a nearby subject (a person, another vehicle, a sign, etc.), a type of a driving road surface, a landmark, line information, and driving lane information, and information required for an autonomous travel/autonomous parking/automatic parking/manual parking mode.

In addition, the surrounding information may further include a distance from an object existing around the vehicle to the vehicle 100, collision possibility, a type of an object, a parking space for the vehicle, an object for identifying the parking space (e.g., a parking line, a string, another vehicle, a wall, etc.), and the like.

The vehicle driving information is not limited to the example described above and may include all information generated from the components provided in the vehicle 100.

The image output unit 850 outputs various visual information under the control of the controller 870. The image output unit 850 may output visual information to a windshield of a vehicle or a separately provided screen, or may output visual information through a panel. The image output unit 850 may correspond to the display module 251 described with reference to FIGS. 4 to 10.

For example, the visual information output by the image output unit 850 is reflected from the windshield or the screen, so that the visual information is displayed on the windshield or the screen. An occupant or passenger simultaneously checks the real world located outside the vehicle 100 and a virtual object displayed on the windshield or the screen, and augmented reality is implemented by the image output unit 850.

The controller 870 performs various operations to be described hereinafter and controls the communication unit 810 and the image output unit 850.

The controller 870 may control one or more devices provided in the vehicle 100 through the communication unit 810.

In detail, the controller 870 may determine whether or not at least one of a plurality of preset conditions is satisfied, based on vehicle driving information received through the communication unit 810. According to a satisfied condition, the controller 870 may control the one or more displays in different ways.

In connection with the preset conditions, the controller 870 may detect an occurrence of an event in an electrical component provided in the vehicle 100 and/or application, and determine whether the detected event meets a preset condition. At this time, the controller 870 may detect the occurrence of the event from information received through the communication unit 810.

The application is a concept including a widget, a home launcher, and the like, and refers to all types of programs that can be run on the vehicle 100. Accordingly, the application may be a program that performs a function of a web browser, a video playback, a message transmission/reception, a schedule management, or an application update.

Further, the application may include a forward collision warning (FCW), a blind spot detection (BSD), a lane departure warning (LDW), a pedestrian detection (PD) A Curve Speed Warning (CSW), and a turn-by-turn navigation (TBT).

For example, the occurrence of the event may be a missed call, presence of an application to be updated, a message arrival, start on, start off, autonomous travel on/off, pressing of an LCD awake key, an alarm, an incoming call, a missed notification, and the like.

As another example, the occurrence of the event may be a generation of an alert set in the advanced driver assistance system (ADAS), or an execution of a function set in the ADAS. For example, the occurrence of the event may be an occurrence of forward collision warning, an occurrence of a blind spot detection, an occurrence of lane departure warning, an occurrence of lane keeping assist warning, or an execution of autonomous emergency braking.

As another example, the occurrence of the event may also be a change from a forward gear to a reverse gear, an occurrence of an acceleration greater than a predetermined value, an occurrence of a deceleration greater than a predetermined value, a change of a power device from an internal combustion engine to a motor, or a change from the motor to the internal combustion engine.

In addition, even when various ECUs provided in the vehicle 100 perform specific functions, it may be determined as the occurrence of the event.

For example, when a generated event satisfies the preset condition, the controller 870 may control the communication unit 810 to display information corresponding to the satisfied condition on one or more displays provided in the vehicle.

The controller 870 may transmit an autonomous driving message to at least one of a plurality of devices provided in the vehicle 100 so as to enable autonomous driving of the vehicle 100. For example, an autonomous driving message may be transmitted to a brake for deceleration, or an autonomous driving message may be transmitted to a steering device for changing a driving direction.

The present disclosure enables drivers of a plurality of vehicles to share their captured images with each other to thereby providing additional information.

Figure 12:
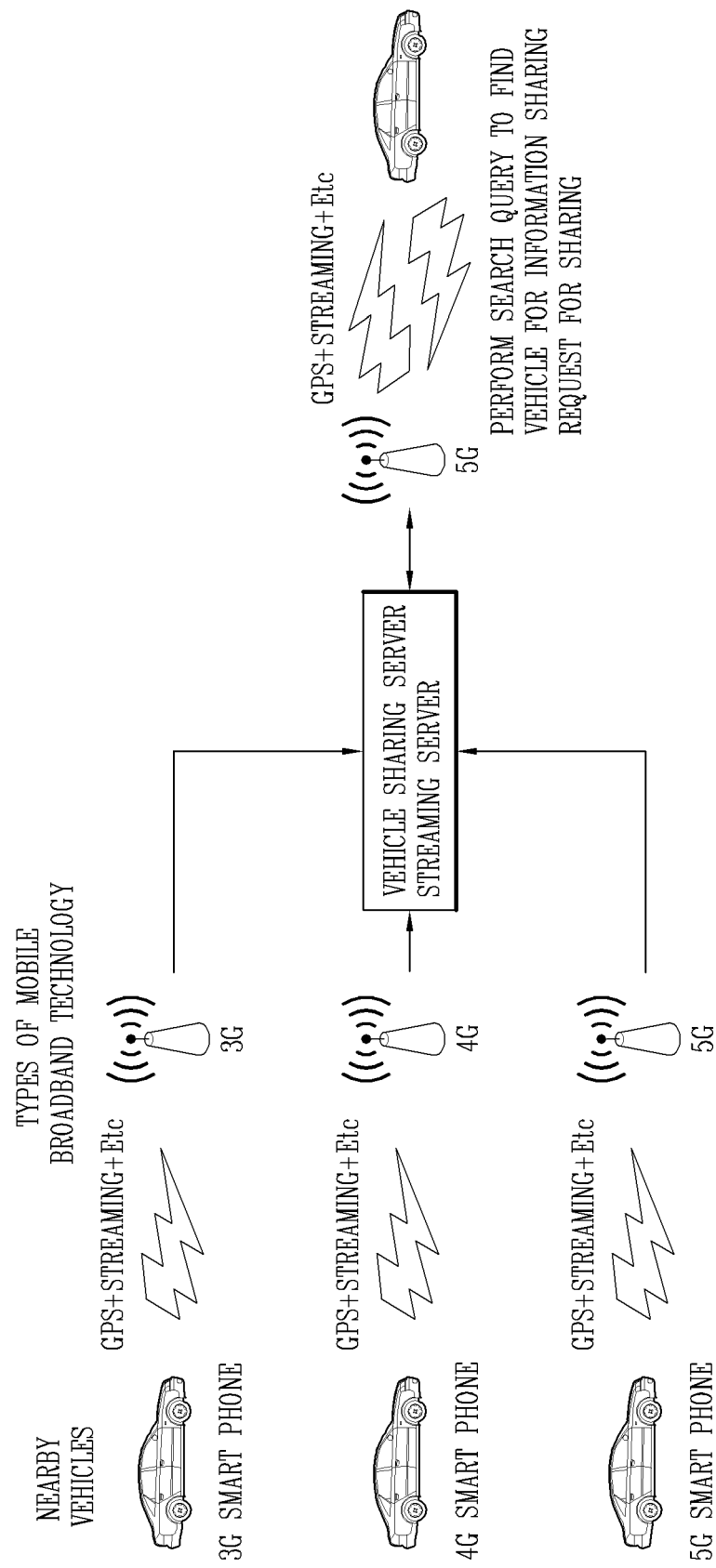
FIG. 12 is a schematic view illustrating a communication method for sharing images between vehicles.
Figure 13:
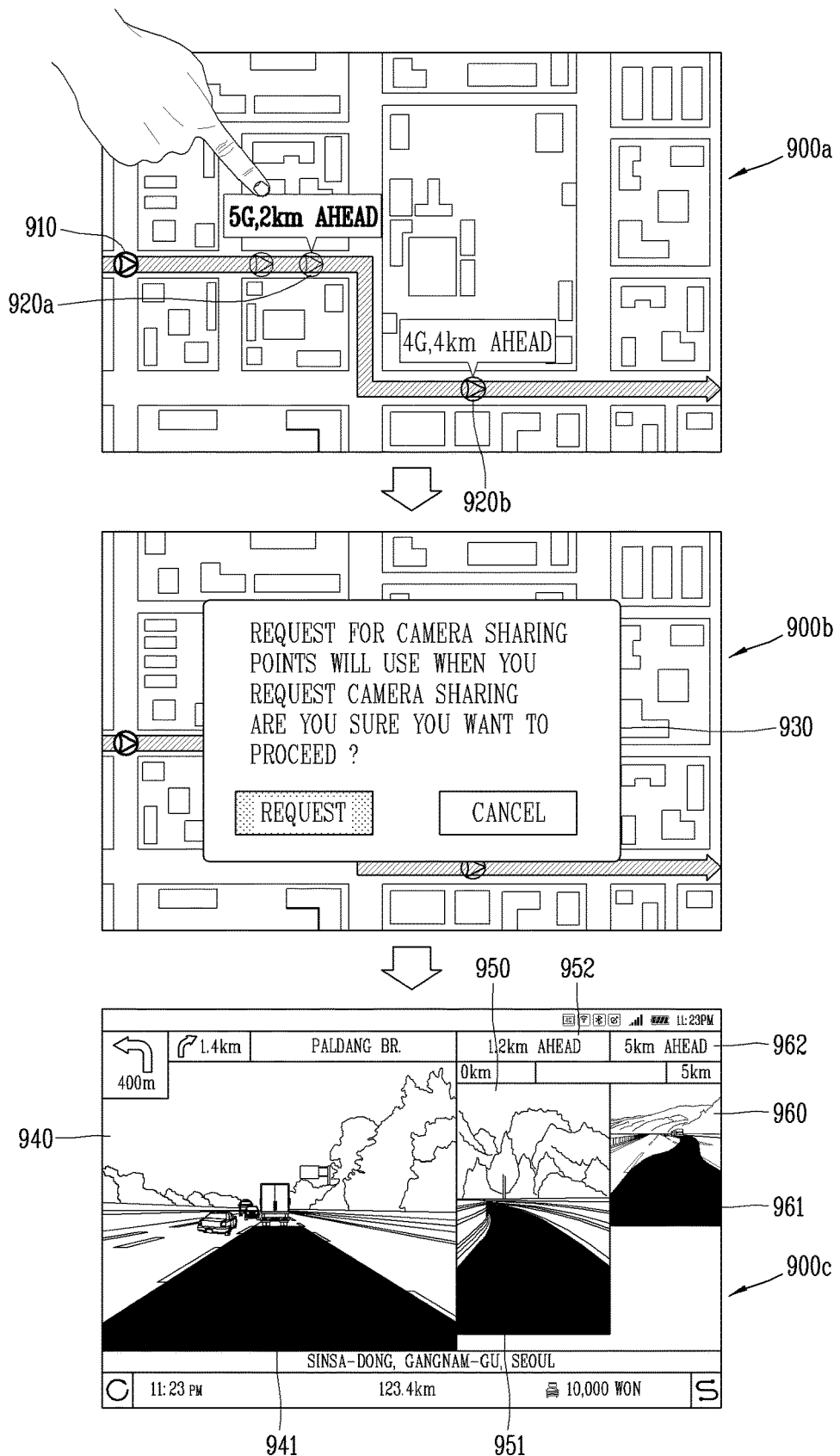
FIG. 13 is a schematic view illustrating image sharing between vehicles.

FIG. 12 is a schematic view illustrating a communication method for sharing images between vehicles, and FIG. 13 is a schematic view illustrating image sharing between vehicles.

Referring to FIG. 12, registered vehicles transmit GPS information, captured image information, and various vehicle information to a preset or predetermined server in real time. These registered vehicles may search for vehicles by receiving information of other vehicles from the preset server and stream an image or video from at least one vehicle among the searched vehicles.

In detail, the controller 870 receives a forward image of the vehicle 100 that captures an image ahead of the vehicle 100. The forward image may be received through the communication unit 810 and include one or more images.

Then, the controller 870 retrieves one or more lanes on which the vehicle 100 is expected or planned to travel from the forward image.

For the sake of convenience, the one or more lanes on which the vehicle 100 is expected to travel will be referred to as a "planned driving lane".

The planned driving lane may refer to a lane on which the vehicle 100 is expected to travel until a time point 't', which is a positive real number, with respect to the current time point. The 't' may vary according to speed of the vehicle 100, characteristics of a road on which the vehicle 100 is traveling, and a speed limit on a road on which the vehicle 100 is traveling.

When the vehicle 100 is driven by autonomous driving, the planned driving lane may refer to a lane on which the vehicle 100 is expected to travel by autonomous driving. When the vehicle 100 is driven manually, the planned driving lane may refer to a lane recommended to a driver.

In order to search for the planned driving lane, the controller 870 may receive a high-definition map (HD map) from a path or route providing device and/or a server, so as to receive vehicle driving information for specifying (or identifying) the planned driving lane.

More specifically, the controller 870 may receive forward path or route information for guiding a road ahead of the vehicle 100 in lane units (lane-by-lane).

The forward path information may provide a driving path to a destination for each lane drawn on the road, which may be route information in accordance with the ADASIS protocol.

The forward path information may be provided by subdividing a path, on which the vehicle should travel or can travel, into lane units. The forward path information may be information for guiding a driving path to a destination on the lane basis. When the forward path information is displayed on a display mounted on the vehicle 100, a guide line for guiding a lane on which the vehicle 100 can travel may be displayed on the map. In addition, a graphic object indicating the location of the vehicle 100 may be included on at least one lane in which the vehicle 100 is located among a plurality of lanes included in the map.

For example, when the road ahead of the vehicle 100 is an 8-lane road, and the planned driving lane is a second lane, the controller 870 may search for the second lane in the forward image.

As another example, when the road ahead of the vehicle 100 is an 8-lane road, and the vehicle 100 is planned to travel on a second lane from the current point or location to 50 m ahead and then move to a third lane, the controller 870 may search for the second lane up to 50 m ahead and the third lane therefrom in the forward image.

Here, searching for a lane may refer to searching for a partial area including the planned driving lane in the entire area of the forward image. This is to allow an occupant on board the vehicle 100 to intuitively recognize the planned driving lane by displaying a carpet image indicating the planned driving lane in a manner of overapplying the searched partial area.

The controller 870 outputs a carpet image or images indicating one or more searched lanes in lane units (or lane-by-lane) through the image output unit 850.

The controller 870 sets an image display area to output visual information based on an occupant's eye position and/or gaze.

Further, the controller 870 determines at least one of a position, size, and shape of a main carpet image based on the occupant's eye position and/or gaze. At least one of the position, size, and shape of the main carpet image displayed on the windshield or the screen may be changed according to the occupant's eye position and/or gaze. This is to provide an augmented reality where the real world and a virtual image are perfectly matched.

The main carpet image that indicates the planned driving lane may overlap the planned driving lane and be a transparent image with a predetermined color.

The predetermined color may vary according to a reference or criterion. For example, in the case of a general road, the main carpet image may be a first color, but when snow is accumulated on the road, the main carpet image may be a second color that is different from the first color.

Through the main carpet image, path or route information regarding a lane on which the vehicle 100 driven by autonomous driving or by a driver is expected to travel may be provided to an occupant on board in lane units.

The controller 870 may provide one or more sub-carpet images, which can be selected by an occupant, as well as the main carpet image.

The controller 870 controls the communication unit 810 to receive an image captured from another vehicle located on a path on which the vehicle 100 is expected to travel. More specifically, an image captured from another vehicle may be encoded to be transmitted to the vehicle 100. Accordingly, when the communication unit 810 receives the image captured from the another vehicle, a separate decoding process is required. A decoder for decoding an encoded image may be embedded in the image output device 800 or the vehicle 100.

The communication unit 810 shares vehicle driving information of the vehicle 100 and other vehicles via communication with a preset server and other vehicles. The controller 870 may search for a vehicle (another vehicle) located on a path on which the vehicle 100 is expected to travel based on a planned driving path or route of the vehicle 100 and location information of other vehicles.

In response to a user request, the controller 870 may receive a captured image from the searched vehicle in real time. The image received in real time may be displayed together with the forward image.

For example, as illustrated in a third drawing of FIG. 13, the controller 870 may receive images captured from other vehicles ahead of the vehicle 100 traveling on a path on which the vehicle 100 is expected to travel, so that the captured images are displayed together with a forward image 940. In the present disclosure, as images 950 and 960 captured from other vehicles are displayed, road conditions may be provided in various ways.

Further, the controller 870 controls the image output unit 850 such that at least one of the forward image 940 and the images 950 and 960 captured from the other vehicles overlaps carpet images 941, 951, and 961.

The controller 870 recognizes a lane from an image captured from another vehicle and uses recognized lane information, location information of the another vehicle received therefrom, and path information on which the vehicle 100 is expected to travel, so as to display an image indicating a lane for the vehicle 100 to be present when the vehicle 100 reaches a position where the another vehicle is currently located. That is, the controller 870 may control such that the image captured from the another vehicle and the carpet image are displayed in an overlapping manner.

As an image, captured from another vehicle present on a path on which the vehicle is expected to travel, and a carpet image are displayed in an overapplying manner, driving information at a longer distance can be provided through augmented reality.

The carpet image may be overlaid or superimposed on the forward image and the images captured from the other vehicles. Such an implementation may be implemented in various ways.

For example, as illustrated in the third drawing of FIG. 13, the controller 870 may control the image output unit 850 such that the forward image 940 and the image 950 captured from another vehicle are displayed individually in a manner of superimposing the carpet images 941 and 951 on the forward image 940 and the image 950 captured from the another vehicle, respectively.

Here, the controller 870 may control the image output unit 850 such that a display area of the forward image 940 is larger than a display area of the image 950 captured from the another vehicle.

The controller 870 may display information related to the another vehicle in addition to the image captured from the another vehicle. For example, as illustrated in the third drawing of FIG. 13, the controller 870 may display a distance 952 between the vehicle 100 and the another vehicle together with the image 950 captured from the another vehicle.

The controller 870 may control such that images captured from other vehicles are displayed in different sizes according to a distance between the vehicle 100 and the other vehicles. In other words, the controller 870 may reduce the displayed size of images captured from the other vehicles as the distance from the vehicle 100 increases. In some implementations, referring to FIG. 13, the controller 870 may control such that the image 950 captured from a vehicle 1.2 km away from the vehicle 100 to be displayed bigger than the image 960 captured from a vehicle 5 km away from the vehicle 100.

When displaying images captured from a plurality of other vehicles, the controller 870 may change output or display locations of the images according to a distance between the vehicle 100 and the other vehicles. In detail, the controller 870 may arrange the images in order along one direction (left to right, or top to bottom) in proportion to the distance of the other vehicles from the vehicle 100.

This may allow a user to intuitively recognize the distance between his or her vehicle and other vehicles by just checking or seeing images captured from the other vehicles.

When a current lane of the vehicle 100 and a lane of another vehicle recognized in an image captured from the another vehicle are different, the controller 870 may process the image captured from the another vehicle based on the current lane of the vehicle 100. For example, the controller 870 may recognize the current lane of the vehicle 100 and the lane of the another vehicle based on objects (e.g., lanes and structures) recognized in the images captured from the vehicle 100 and the another vehicle. When the current lane of the vehicle 100 and the lane of the another vehicle recognized in the image captured from the another vehicle are different, the controller 870 recognizes the current lane of the vehicle 100 from the image captured from the another vehicle, and processes an image such that the current lane of the vehicle 100 is located at a center of the image. Then, the controller 870 controls such that the processed image is displayed.

In order to minimize the sense of incompatibility or disharmony of the processed image, the controller 870 may process the image such that a vanishing point included in the image captured from the another vehicle is located on the current lane of the vehicle 100, rather than just cropping a portion of the image. This may allow the image captured from the another vehicle to be seen as if it is captured from the current lane of the vehicle 100.

When the vehicle 100 arrives at a position where the another vehicle is currently located but a lane on which the vehicle 100 is expected to travel and the lane of the another vehicle recognized in the image captured from the another vehicle are different, the controller 870 may process the image captured from the another vehicle with respect to the lane on which the vehicle 100 is expected to travel. For example, when a lane on which the vehicle 100 is expected to travel and a lane of the another vehicle recognized in an image captured from the another vehicle are different, the controller 870 recognizes the lane on which the vehicle 100 is planned to travel and processes an image such that the lane on which the vehicle 100 is expected to travel is located at a center of the image. Then, the controller 870 controls such that the processed image is displayed.

When a distance between the vehicle 100 and the another vehicle is not great, the forward image and an image captured from the another vehicle may be partially the same. The controller 870 may compare the forward image and the image captured from the another vehicle, synthesize (merge or combine) the forward image and the image captured from the another vehicle when they are partially the same, then output the synthesized image.

During the image synthesis, the controller 870 may synthesize an image based on a common object included in the forward image and the image captured from the another vehicle. Various objects may be included in an image captured from a moving vehicle. The objects may include, for example, lanes, other vehicles, pedestrians, motorcycles, traffic signals, light, roads, structures, speed bumps, landmarks, animals, and the like. Although a specific object is stationary, a position of the specific object changes in an image captured from a moving vehicle.

The controller 870 extracts an object having the smallest motion or movement per unit time from the forward image and the image captured from the another vehicle. Then, the controller 870 determines whether the objects extracted from the forward image and the image captured from the another vehicle are the same object. When they are the same object, the controller 870 synthesizes the two images based on the extracted objects.

When the objects extracted from the forward image and the image captured from the another vehicle are not the same object, the controller 870 extracts an object having a second smallest motion per unit time from one of the forward image and the image captured from the another vehicle. Then, the controller 870 determines whether the object newly extracted from the one of the forward image and the image captured from the another vehicle and the objects previously extracted from the one and the other one are the same object. The controller 870 repeats these processes until the same object is extracted from the two images, and then synthesizes the two images based on the same object.

By way of further example, the controller 870 may use a map matching feature during the image synthesis. More specifically, the controller 870 accurately matches coordinates of the vehicle 100 and the another vehicle on map data by using GPS information of the vehicle 100 and the another vehicle. Here, in order to increase the matching accuracy, dead reckoning may be used. Using the coordinates of the vehicle 100 and the another vehicle on the map data, the controller 870 may calculate a distance between the vehicle 100 and the another vehicle and a difference in an image capturing angle, and the like, and synthesize two images based on these calculation results.

The controller 870 may control the image output unit 850 such that the synthesized image and the carpet image are displayed in an overlapping manner. In the present disclosure, screen information that is wider than the angle of view of the camera may be provided to the driver.

According to the present disclosure, not only a path on which the vehicle 100 is expected to travel but also a path on which the another vehicle is expected to travel may be guided through carpet images. In detail, the controller 870 receives a path on which the another vehicle is expected to travel from the another vehicle, and controls the image output unit 850 such that a first carpet image indicating the path on which the vehicle 100 is expected to travel and a second carpet image indicating the path on which the another vehicle is planned to travel are overlapped with or superimposed on the synthesized image.

Here, the first carpet image and the second carpet image may be displayed in different shapes or manners. For example, the first and second carpet images may be displayed in different colors or different patterns. This may enable a driver to intuitively distinguish a route of his or her own vehicle from a route of another vehicle.

In some implementations, the first and second carpet images may be displayed in different thicknesses. The controller 870 may display carpet images such that the first carpet image has the constant or identical thickness and the second carpet image has the thickness in inverse proportion to a distance between the vehicle 100 and the another vehicle, allowing the driver to intuitively recognize the distance between his or her vehicle and the another vehicle.

Further, when a planned driving path of the vehicle 100 and a planned driving path of the another vehicle are the same, the controller 870 may control the image output unit 850 such that a third carpet image having a different shape from the first and second carpet images is superimposed on the synthesized image.

When the driving path of at least one of the vehicle 100 and the another vehicle is changed while the third carpet image is being displayed, the controller 870 stops the display of the third carpet image and controls the image output unit 850 such that the first and second carpet images are superimposed on the synthesized image.

In the present disclosure, confusion of a driver may be avoided or reduced by minimizing the display of carpet images when a route of his or her own vehicle and a route of the another vehicle are the same.

In the present disclosure, a first carpet image indicating a path on which the vehicle 100 is expected to travel is superimposed on the forward image, and a second carpet image indicating a path on which the another vehicle is expected to travel is overlaid on an image captured from the another vehicle. This may allow a driver to predict a path of another vehicle in advance and select an appropriate lane to drive.

Further, the controller 870 may control the image output unit 850 such that an image captured from the another vehicle overlaps the first carpet image and the second carpet image. This may allow the driver to check both a driving path of his or her own vehicle and a driving path of the another vehicle in the image captured from the another vehicle.

As described above, in the present disclosure, a driving path is guided or provided to a driver by displaying a forward image captured from his or her own vehicle and an image captured from another vehicle together, and by superimposing carpet images indicating a planned driving path on the captured images.

Hereinafter, an example of performing an image sharing request to another vehicle through the image display device according to the present disclosure will be described.

The controller 870 may display a list of other vehicles present on a driving path of the vehicle 100 in a partial display area of the image output unit 850.

For example, as illustrated in a first drawing of FIG. 13, the controller 870 may control the image output unit 850 such that a map image 900a is displayed thereon, and a graphic object 910 indicating a location of the vehicle 100 and graphic objects 920a and 920b indicating locations of other vehicles are displayed on the map image 900a. When a user input is applied to the graphic object 920a or the graphic object 920b indicating the locations of the other vehicles, the controller 870 transmits an image sharing request to a vehicle corresponding to the graphic object to which the user input is applied.

Here, shapes of the graphic objects indicating the locations of the other vehicles may vary according to current communication state or condition of the other vehicles. Information related to the other vehicles may be displayed together with the graphic objects. More specifically, the information related to the other vehicles may include communication condition, a distance between the vehicle 100 and other vehicles, whether or not an image captured from other vehicles is combined with another image.

For example, referring to FIG. 13, together with the graphic objects 920a and 920b indicating the locations of other vehicles, the controller 870 may display types of wireless communication standards (5G or 4G) available in other vehicles and a distance from other vehicles. In detail, when another vehicle that is 4 km away from the vehicle 100 is not available for 5G communication and is only available for 4G communication, the controller 870 may output "4G, 4 km ahead" together with the graphic object 920b indicating the location of the another vehicle.

Further, when communication signal strength of another vehicle falls below a preset value, the controller 870 may display a separate graphic object indicating a delay in the image.

In the present disclosure, as communication condition of another vehicle is informed to a driver, allowing the driver to determine whether or not image sharing with the another vehicle is smooth.

By way of further example, the controller 870 may display information related to other vehicles together with a list of other vehicles present on a driving path of the vehicle 100. In response to a user input to the list, the controller 870 transmits an image sharing request to at least one of the vehicles included in the list. Here, the controller 870 may arrange the list such that vehicles using a higher standard than the communication standard of an own vehicle (the vehicle 100) are given a higher priority on the list.

In the present disclosure, as information related to other vehicles located on a path on which a driver's or user's vehicle is expected to travel is displayed in an intuitive manner, allowing the driver to easily select a vehicle (another vehicle) to share an image.

When the user requests for an image sharing with another vehicle that is in poor communication condition, the controller 870 may enlarge an image captured from the another vehicle to display. In detail, while image reception from the another vehicle is stopped, the controller 870 may gradually enlarge the last displayed image. This may provide an effect that the another vehicle becomes closer to the own vehicle in a state that the another vehicle is stationary when the image reception is not available due to the poor communication condition of the another vehicle.

In the present disclosure, specific rewards or compensation is provided to another vehicle when requesting image sharing to the another vehicle. More specifically, referring to a second drawing of FIG. 13, the controller 870 controls the image output unit 850 to output a message 930 indicating the use of points when the driver requests for sharing an image captured from the another vehicle.

In addition, the controller 850 may transmit (reward) points information corresponding to points offered to the another vehicle and receive an image captured from the another vehicle. The another vehicle may transmit its captured image only when receiving preset or predetermined points information.

Hereinafter, the entire process in which the controller searches for nearby vehicles, receives an image sharing request from the user, and displays an image captured from another vehicle will be described in detail with reference to the accompanying drawings.

Figure 14:
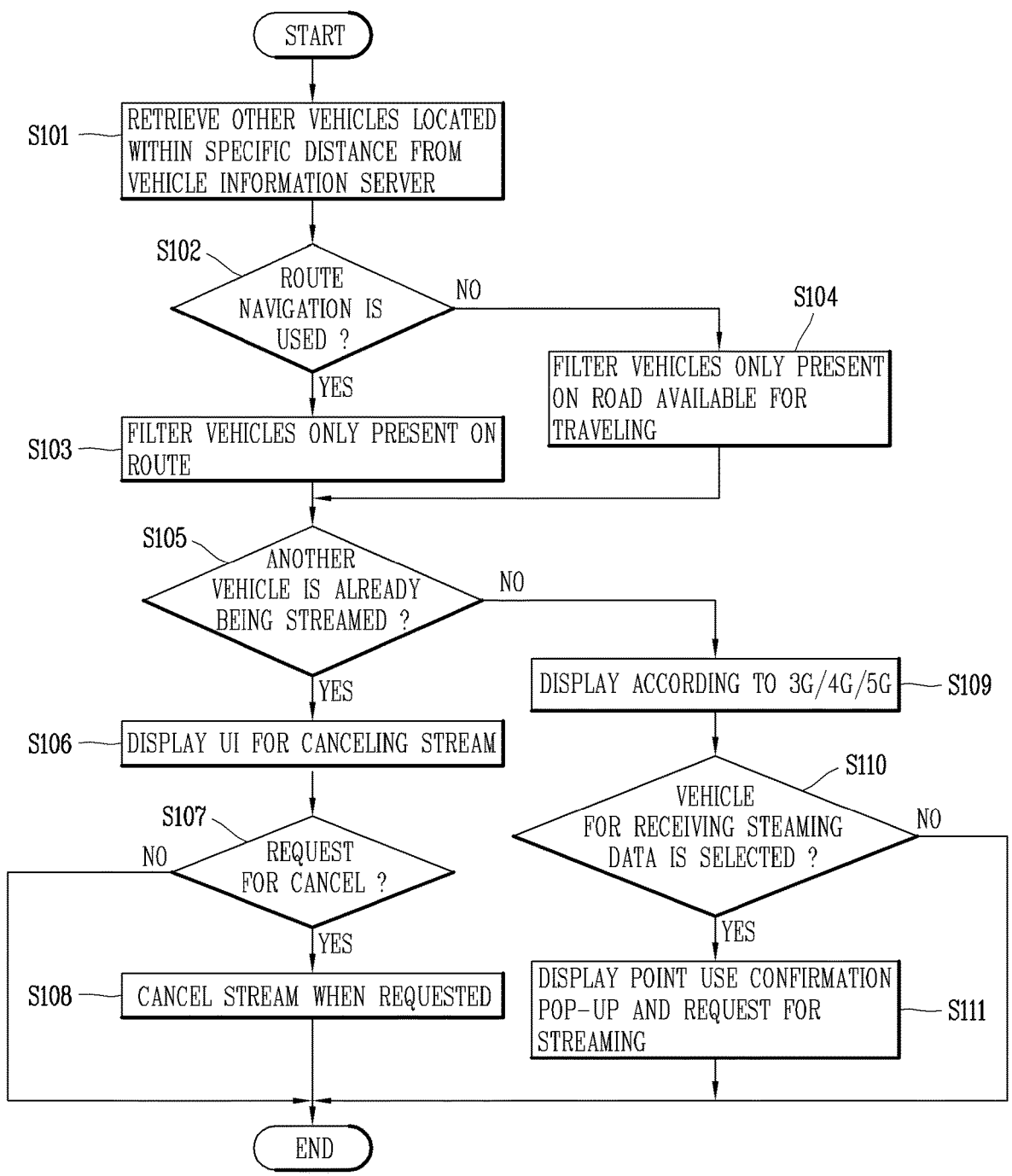
FIG. 14 is a flowchart of an exemplary method of image sharing between vehicles.
Figure 15:
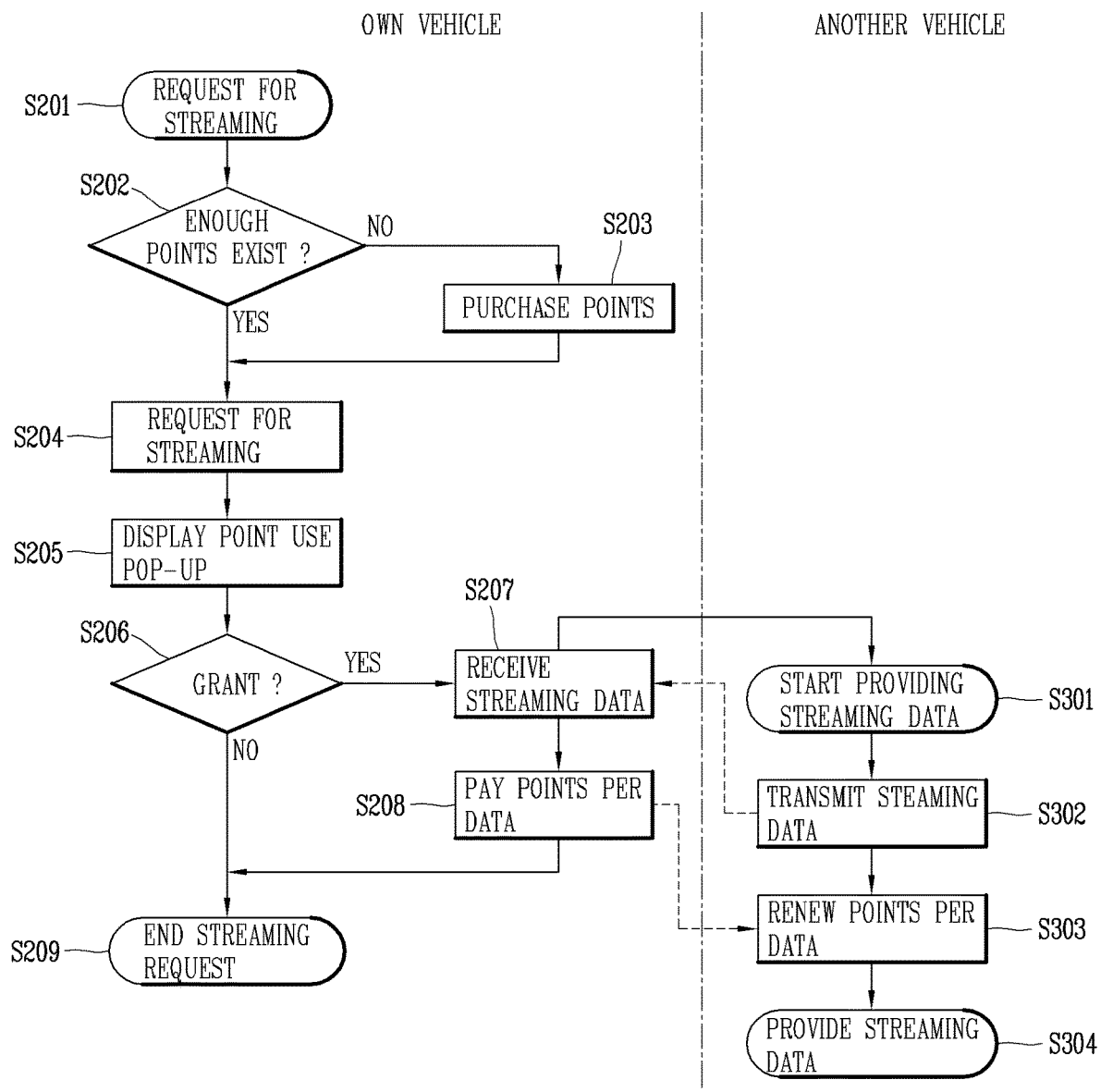
FIG. 15 is a flowchart of an exemplary method of using points for image sharing between vehicles.

FIG. 14 is a flowchart of an exemplary method of image sharing between vehicles, and FIG. 15 is a flowchart of an exemplary method of using points for image sharing between vehicles.

First, referring to FIG. 14, the controller 870 searches for vehicles only within a specific distance from the own vehicle. This is because an image captured from a vehicle located too far away from the own vehicle may not be useful or helpful to the driver.

When route navigation is used in the own vehicle, the controller 870 only filters vehicles present on the route of the own vehicle. When the route navigation is not used in the own vehicle, the controller 870 filters vehicles present on a road on which the own vehicle can travel.

When the number of searched vehicles exceeds a predetermined number, the controller 870 may filter the searched vehicles according to a predetermined reference. Here, the controller 870 may filter the searched vehicles such that a distance between the own vehicle and the filtered vehicles gradually increases. Accordingly, other vehicles located at various distances from the own vehicle are provided as candidates for streaming.

Then, the controller 870 determines whether an image captured from another vehicle is currently being streamed. When an image captured from the another vehicle is already being streamed, the controller 870 may display a graphic object indicating 'end streaming' together with a streaming image. When a user input is applied to the graphic object, the controller 870 may end streaming.

On the other hand, when an image captured from another vehicle is not being streamed, the controller 870 outputs a filtered list of other vehicles and displays information related to the other vehicles included in the list.

Finally, when a vehicle for receiving a streaming image is selected by the driver, the controller 870 transmits points information to the selected vehicle. The controller 870 starts streaming an image upon receiving an image captured from the selected vehicle.

Hereinafter, an example of transmitting and receiving points information when sharing an image will be described with reference to the accompanying drawings.

Referring to FIG. 15, when the controller 870 receives a streaming request, the controller 870 determines whether a certain amount of points are registered to the own vehicle or the driver. Points information of the own vehicle or the driver may be received from a predetermined server.

When the own vehicle or the driver has enough points available for use, the controller 870 uses points registered to the own vehicle or the driver, and transmits points information corresponding to the points paid to the another vehicle or the predetermined server.

When the points information is transmitted to the predetermined server, the predetermined server transmits a message informing that the points information has been transferred to the another vehicle.

When the another vehicle receives the points information from the own vehicle or the predetermined server, an image captured therefrom is transmitted to the own vehicle.

Points paid to the another vehicle may vary according to the size of data streamed from the another vehicle to the own vehicle. As a stream time increases, the amount of points paid by the own vehicle may increase.

The controller 870 may calculate the amount of data periodically received while streaming an image captured from the another vehicle, and pay points corresponding to the calculated data to the another vehicle.

When points are not paid from the own vehicle, the another vehicle may stop the image transmission.

The points may be separately purchased by the driver, or points received from other vehicles may be used. More specifically, the driver may receive points from another vehicle by providing its forward image to the another vehicle. Points paid in this way may be used to stream images taken by other vehicles.

Hereinafter, a method of transmitting and receiving data between vehicles using the communication unit will be described in more detail.

Figure 16:
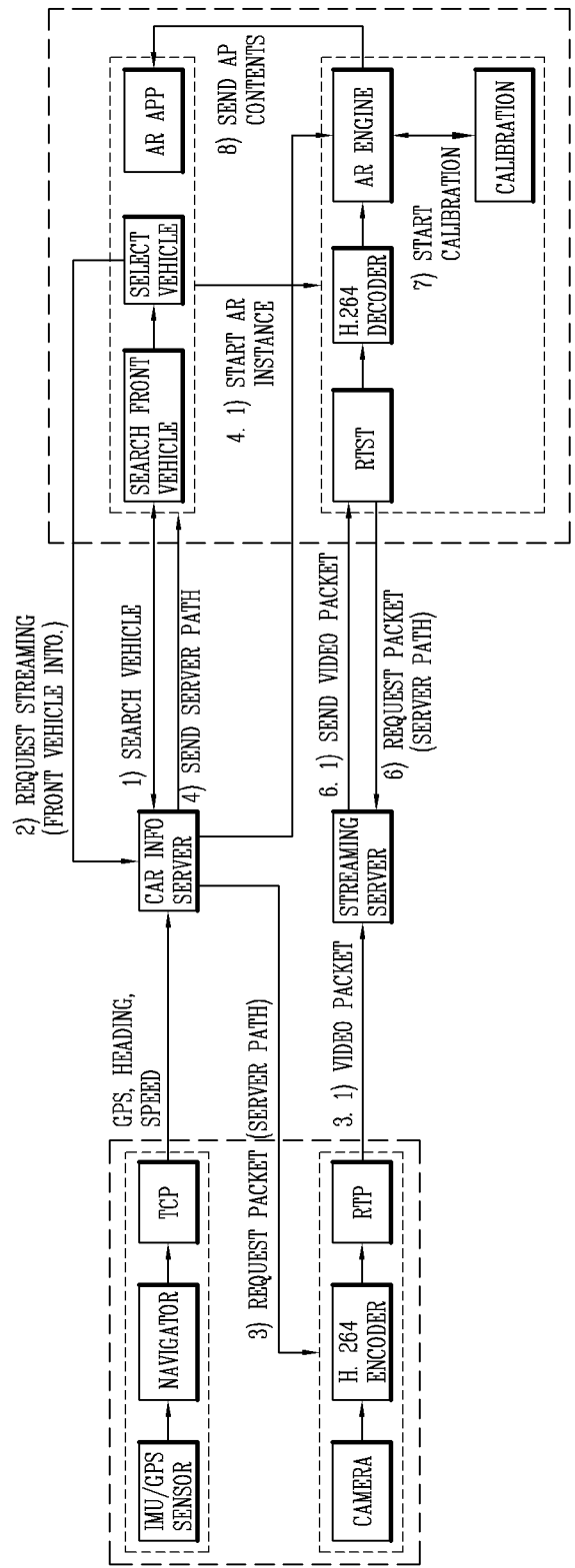
FIG. 16 is a conceptual diagram illustrating data transmission and reception between vehicles.

FIG. 16 is a conceptual diagram illustrating data transmission and reception between vehicles.

Referring to FIG. 16, a plurality of vehicles periodically transmits GPS, heading, and speed information to a vehicle information server.

The controller 870 receives GPS information of other vehicles from the vehicle information server and searches for other vehicles located within a specific distance from the own vehicle.

Then, when another vehicle for streaming an image is selected by the driver, the controller 870 transmits information of the selected vehicle and a streaming request to the vehicle information server.

When the streaming request is received by the vehicle information server, the streaming request and an address of a streaming server are transmitted to the selected vehicle.

When the selected vehicle receives the streaming request, its captured image is transferred to the streaming server.

The vehicle information server transmits the address of the streaming server to the own vehicle. In addition, the vehicle information server transmits driving information of the selected vehicle to the own vehicle.

The controller 870 sends a streaming request to the streaming server using the address of the streaming server. The streaming server transmits an image taken by the selected vehicle to the own vehicle, and the controller 870 uses the image received from the streaming server and the driving information of the selected vehicle received from the vehicle information server to generate and display an augmented reality image.

At this time, the controller 870 calculates calibration of a camera of the selected vehicle by using a calibration result calculated from a camera image of the own vehicle. Hereinafter, a method of calibrating a camera of another vehicle and a camera of a driver's vehicle will be described with reference to the accompanying drawings.

Figure 17:
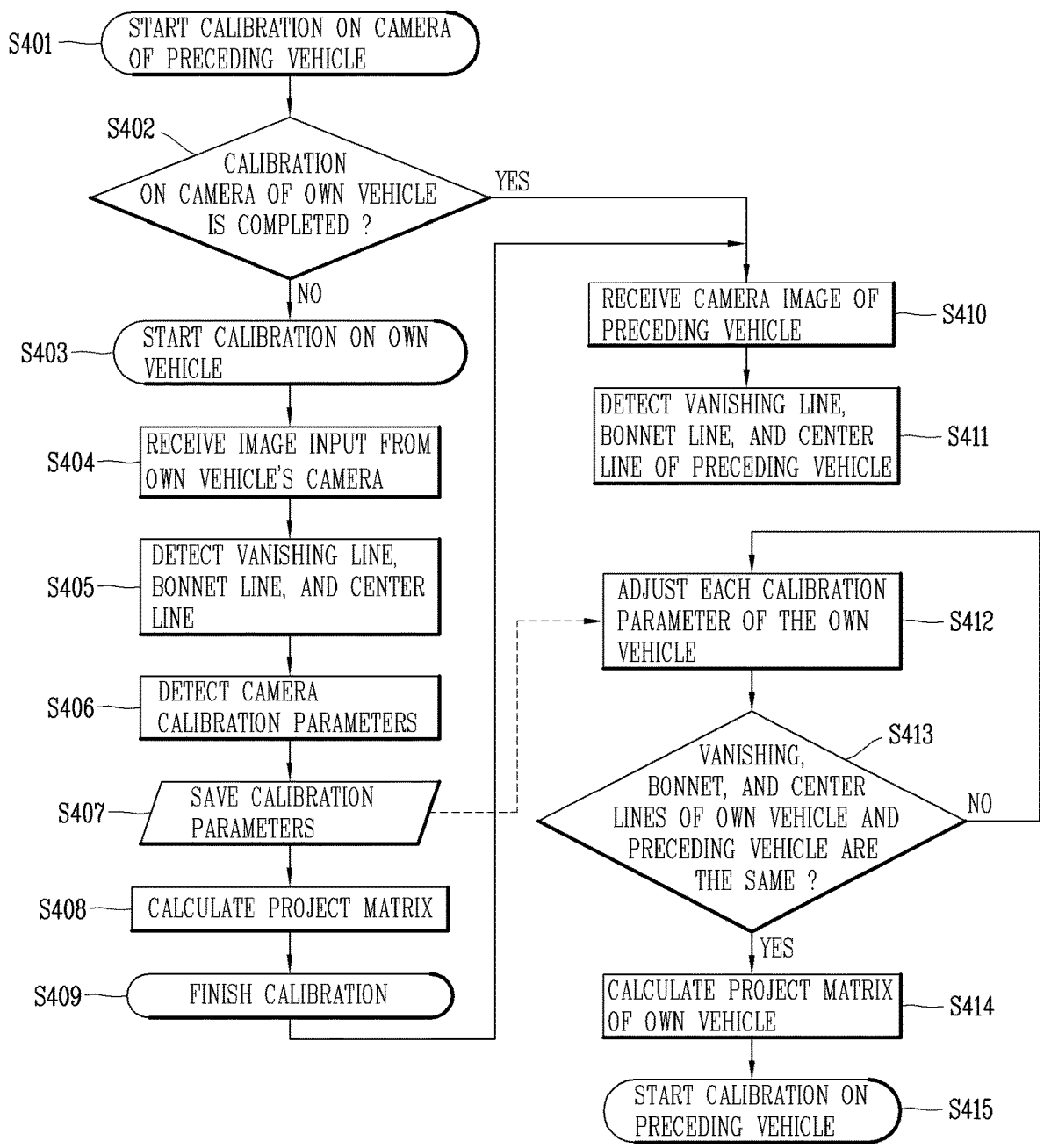
FIG. 17 is a flowchart of an exemplary method of calibrating a vehicle camera.

FIG. 17 is a flowchart of an exemplary method of calibrating a vehicle camera.

Referring to FIG. 17, when calibrating a camera of a preceding vehicle (a vehicle ahead) (S401), the controller 870 determines whether calibration on a camera of an own vehicle is completed (S402).

When the calibration of the own vehicle has not been completed, the controller 870 performs calibration on the own vehicle (S403). More specifically, the controller 870 receives a forward image from the camera (S404).

Then, the controller 870 detects a Vanishing Line (V), a Bonnet Line (B), and a Center Line (C) from the forward image (S406), and stores calibration parameters of the own vehicle (S407).

Finally, the controller 870 calculates a project matrix of the own vehicle using the calibration parameters of the own vehicle (S408), and then finishes the calibration of the own vehicle (S409).

Thereafter, the controller 870 receives an image captured from the camera of the preceding vehicle (S410), and detects a Vanishing Line (V), a Bonnet Line (B) and a Center Line (C) from the received image (S411).

The controller 870 determines whether the Vs, Bs, and Cs of the own vehicle and the preceding vehicle are the same (S413), and adjusts calibration parameters of the own vehicle until the Vs, Bs, and Cs of the own vehicle and the preceding vehicle are identical (S412). Then, the controller 870 recalculates the project matrix of the own vehicle using the adjusted calibration parameters of the own vehicle (S414), and performs calibration of the camera of the preceding vehicle based on this (S415).

Images received from a plurality of vehicles may be displayed together on the image display device. Hereinafter, an example of displaying images received from a plurality of vehicles together with an image of an own vehicle will be described in detail.

Figure 18:
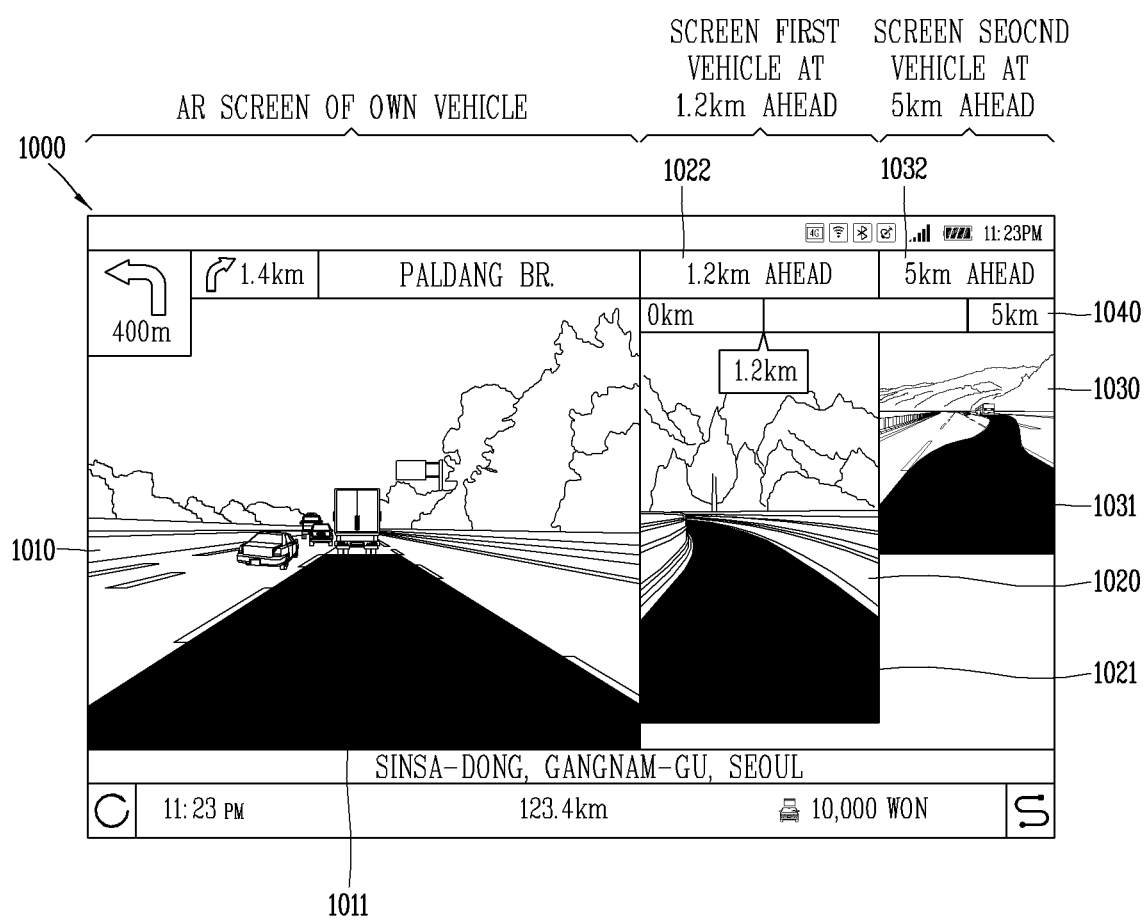
FIGS. 18 and 19 are schematic views illustrating an example of displaying images received from a plurality of vehicles together.
Figure 19:
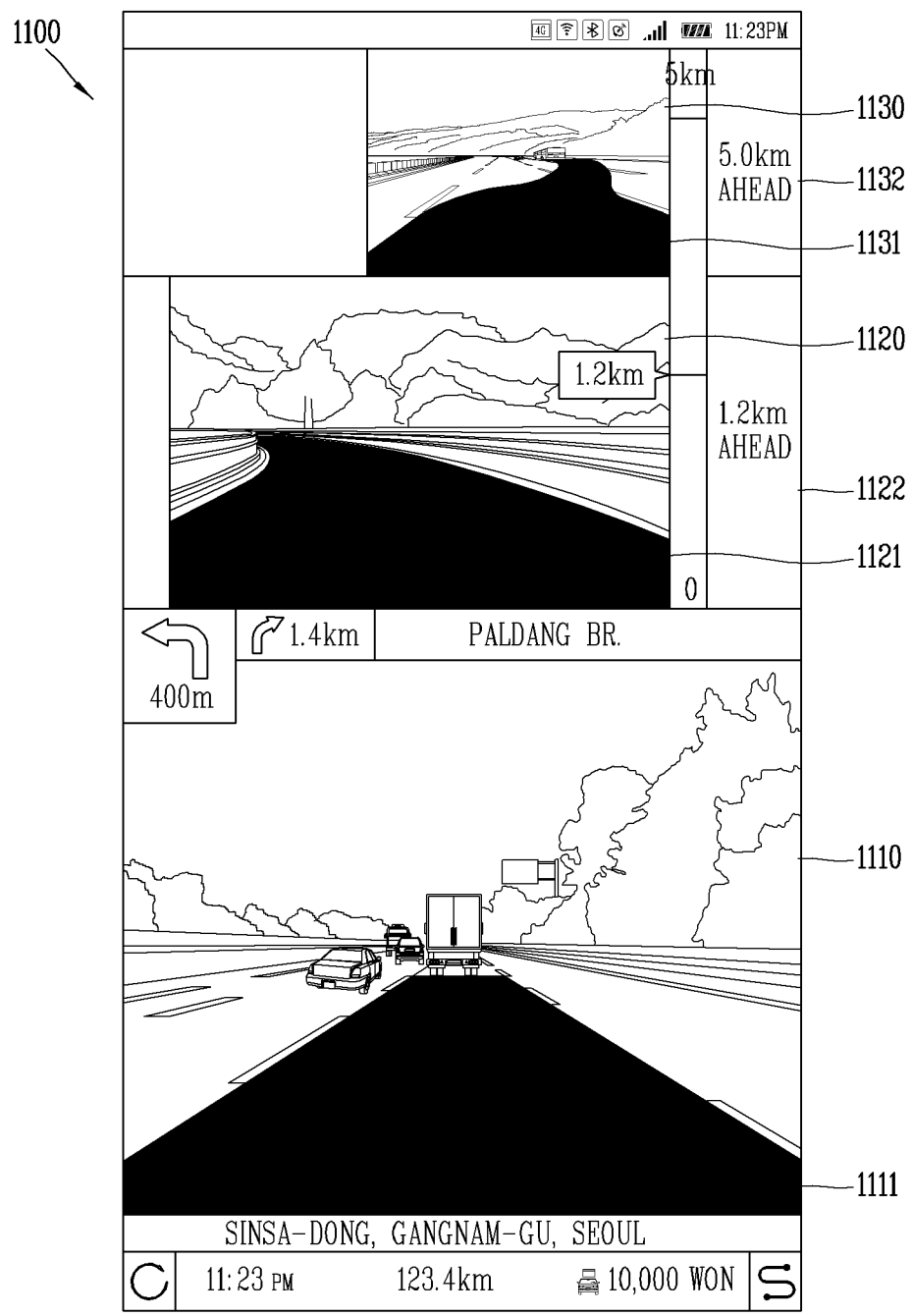

FIGS. 18 and 19 are schematic views illustrating an example of displaying images received from a plurality of vehicles together.

Referring to FIG. 18, the image output unit 850 may display images 1020 and 1030 received from vehicles located at different positions from a forward image 1010 of an own vehicle. Carpet images 1011, 1021, and 1031 indicating a planned driving path of the own vehicle may be superimposed on the images, respectively.

In addition, graphic objects 1022 and 1032 indicating a distance between the own vehicle and other vehicles may be displayed on the image output unit 850. Also, a progress bar 1040 indicating a relative distance between the other vehicles may be displayed on the image output unit 850. When the distance between the other vehicles reaches 0, the display of one of the images received from the other vehicles may be stopped.

In some implementations, as illustrated in FIG. 19, the controller 870 may arrange and display a plurality of images in a vertical direction in consideration of a driver's gaze.

Hereinafter, an example of synthesizing a plurality of images received from other vehicles in the image display device according to the present disclosure will be described in detail.

Figure 20:
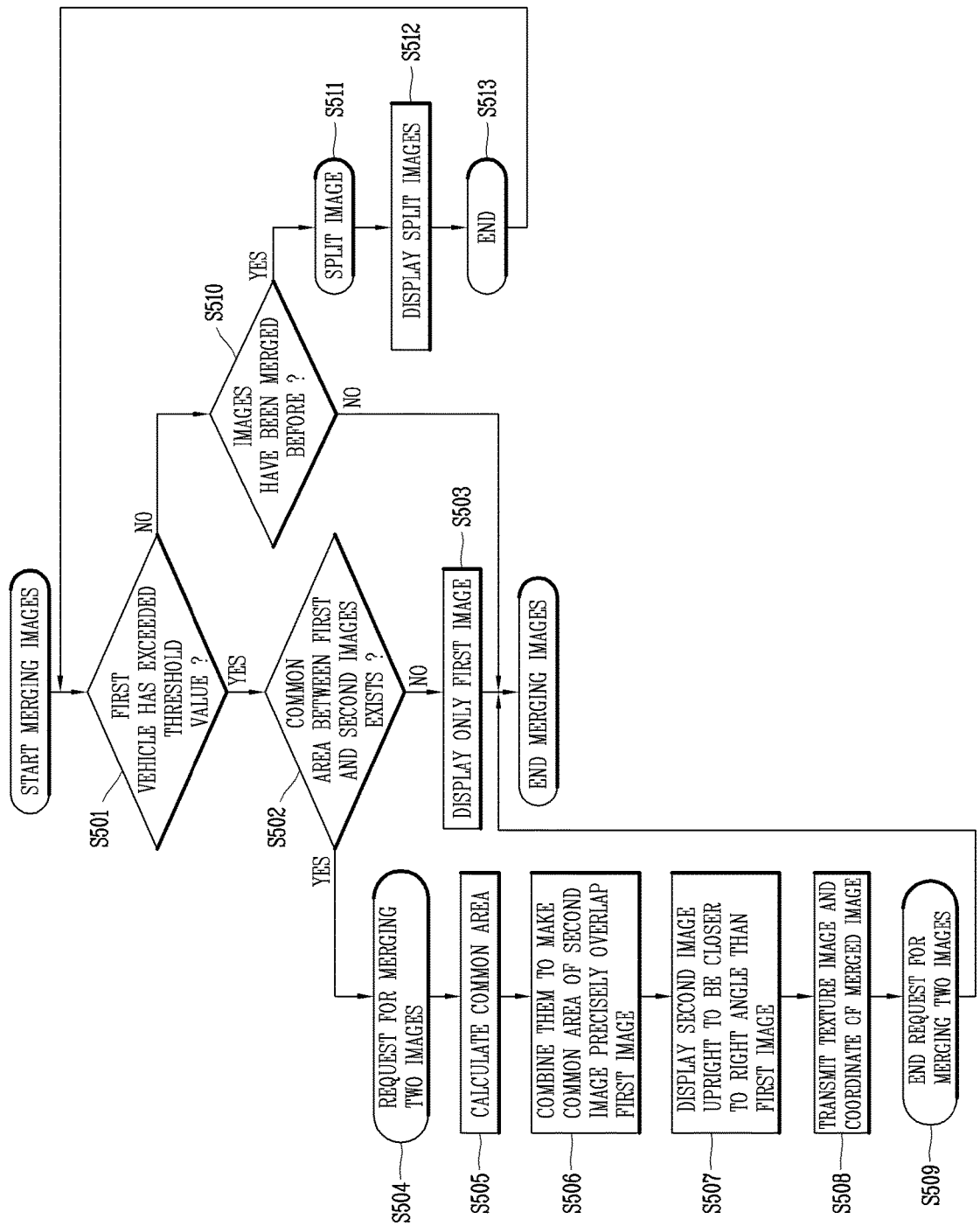
FIG. 20 is a flowchart of synthesizing a plurality of images received from other vehicles.

FIG. 20 is a flowchart of synthesizing a plurality of images received from other vehicles.

When a distance between two other vehicles (first and second vehicles) becomes closer within a predetermined distance, the controller 870 determines that the two vehicles have exceeded a threshold value and combines images captured from the two vehicles.

More specifically, referring to FIG. 20, the controller 870 determines whether the first vehicle has exceeded a threshold value (S501).

When the first vehicle has not exceeded the threshold value, the controller 870 determines whether images received from the first vehicle and the second vehicle have been previously merged or synthesized (S510). When they have been previously synthesized, the controller 870 splits the two images to display (S512). On the other hand, when they have not been previously synthesized, the controller 870 finishes image synthesis.

When the first vehicle has exceeded the threshold value, the controller 870 determines whether there is a common area between the two images (S502). If there is no common area, the controller 870 only displays the image received from the first vehicle (S503).

When there is a common area, the controller 870 starts merging the two images (S504). Here, the controller 870 calculates a common area of the two images (S505), and combines the common area of the image received from the second vehicle to perfectly or precisely overlap the image received from the first vehicle (S506). Then, the controller 870 displays the image received from the second vehicle upright to be closer to a right angle than the image received from the first vehicle (S507). The controller 870 transmits a texture image and coordinates of the synthesized image so as to be displayed on the image output unit 850.

When there is a plurality of synthesizable images in the plurality of images received from the two other vehicles, the controller 870 may generate a plurality of synthesized images from one of the plurality of images and display a list of the plurality of synthesized images. Then, the controller 870 displays an image selected by a user among the images included in the list.

In the present disclosure, images of two nearby vehicles are synthesized to thereby provide a wider field of view to the driver.

According to the present disclosure, when an own vehicle reaches the destination, image or video streaming may be ended without a separate user request. In detail, when the own vehicle is located within a predetermined distance from the destination, the controller 870 may terminate the output of the received image. Thus, unnecessary data usage may be minimized.

According to the present disclosure, when another vehicle arrives at a destination of the own vehicle, a destination image captured from the another vehicle reaching the destination may be displayed until the own vehicle reaches the destination. In detail, when at least one vehicle among other vehicles is located within a predetermined distance from the destination, the controller 870 displays the destination captured from the at least one vehicle until the own vehicle is located within the predetermined distance from the destination.

Images after the destination captured from other vehicles are not useful to a driver. In the present disclosure, an image captured when another vehicle reaches a destination of an own vehicle is continuously displayed, which may be useful for the driver to reach the destination.

In some implementations, when a specific vehicle reaches a destination of the own vehicle while streaming an image captured by the specific vehicle, the controller 870 may perform streaming to another vehicle that has not reached the destination.

In some implementations, when an image received from another vehicle satisfies a preset condition, the controller 870 may output a warning message to the image output unit 850. In detail, the controller 870 may recognize a situation or event in an image received from the another vehicle. When an accident event is detected, the controller 870 may display a warning message indicating an 'accident'. This may give more time for the driver to respond to the accident.

According to the present disclosure, a specific image may be enlarged by user's selection while displaying images taken from a plurality of vehicles.

Figure 21:
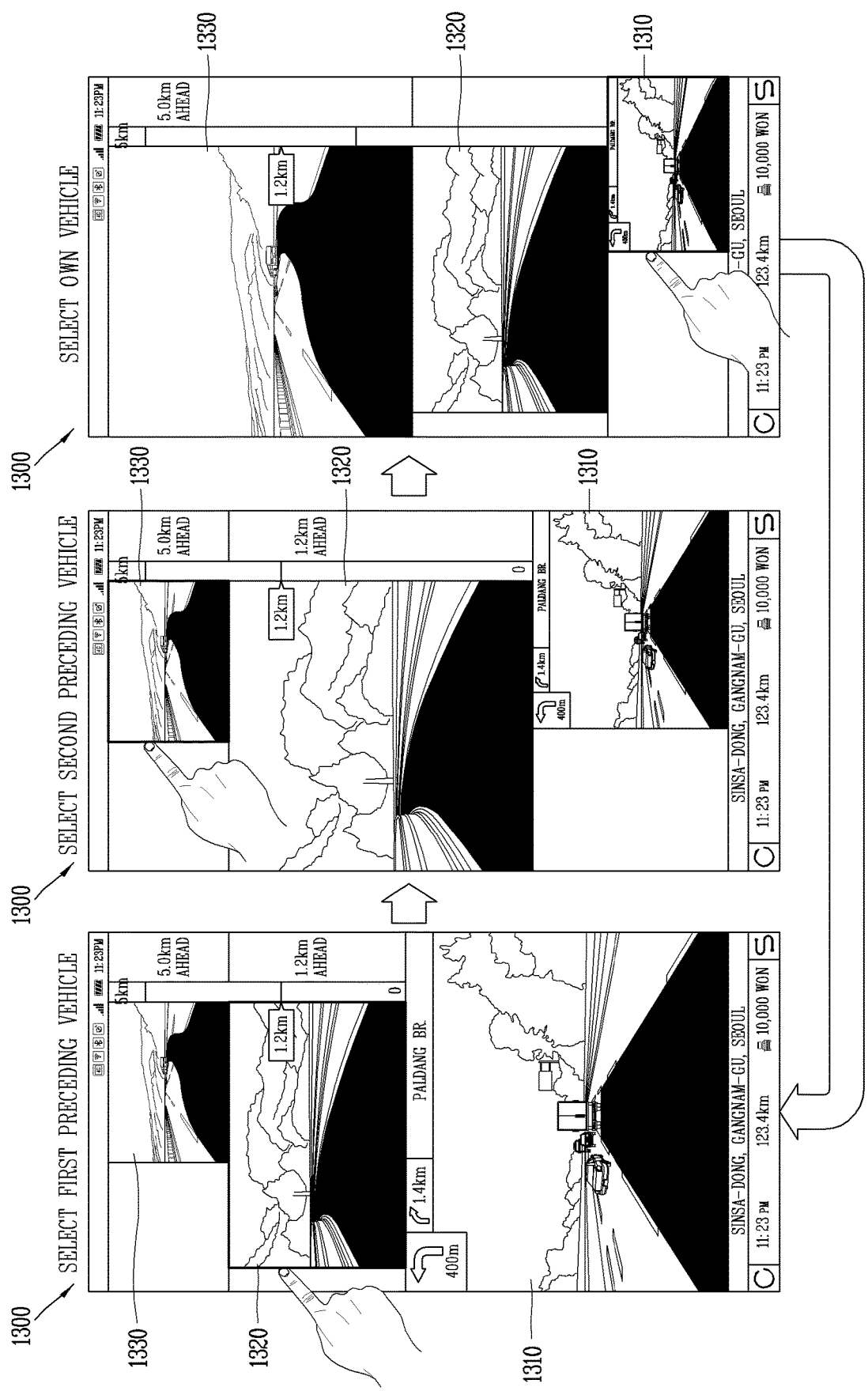
FIG. 21 is a schematic view illustrating an example in which a specific image is displayed in a larger size according to user selection.

FIG. 21 is a schematic view illustrating an example in which a specific image is displayed in a larger size by user selection.

Referring to FIG. 21, a forward image 1310 captured from an own vehicle and images 1320 and 1330 received from other vehicles may be displayed on the image output unit 850. When a user input is applied to one of the images, the controller 870 may enlarge an image to which the user input is applied so that the image is displayed in the largest size.

As described above, according to the present disclosure, an occupant on board a vehicle driven by autonomous driving or by a driver may receive route information in lane units through a carpet image.

In addition, according to the present disclosure, an occupant on board a vehicle may be provided with more various driving information through image information collected from other vehicles ahead of the vehicle.

Meanwhile, the present disclosure enables a carpet image to be changed through data transmission and reception between vehicles. In detail, the controller controls the communication unit to receive location information and route information of other vehicles located within a predetermined distance from the vehicle. When receiving location information and route information from another vehicle that satisfies a preset condition, the controller controls the image output unit such that the carpet image is changed based on the location information and route information received.

More specifically, when a route on which the vehicle is expected to travel and a route on which the another vehicle is planned to travel are at least partially the same, the controller controls the image output unit such that the carpet image is changed based on the location information and the route information.

According to the present disclosure, when the vehicle (own vehicle) and another vehicle are expected to travel on the same route, a carpet image may be changed and displayed to prevent collision between the two vehicles.

The carpet image may include a first sub carpet image indicating a current driving lane of the vehicle, a second sub carpet image indicating a target lane of the vehicle, and a third sub carpet image that connects the first sub carpet image and the second sub carpet image to guide a path for a lane change. That is, the carpet image may be divided into three parts or sections.

Figure 22:
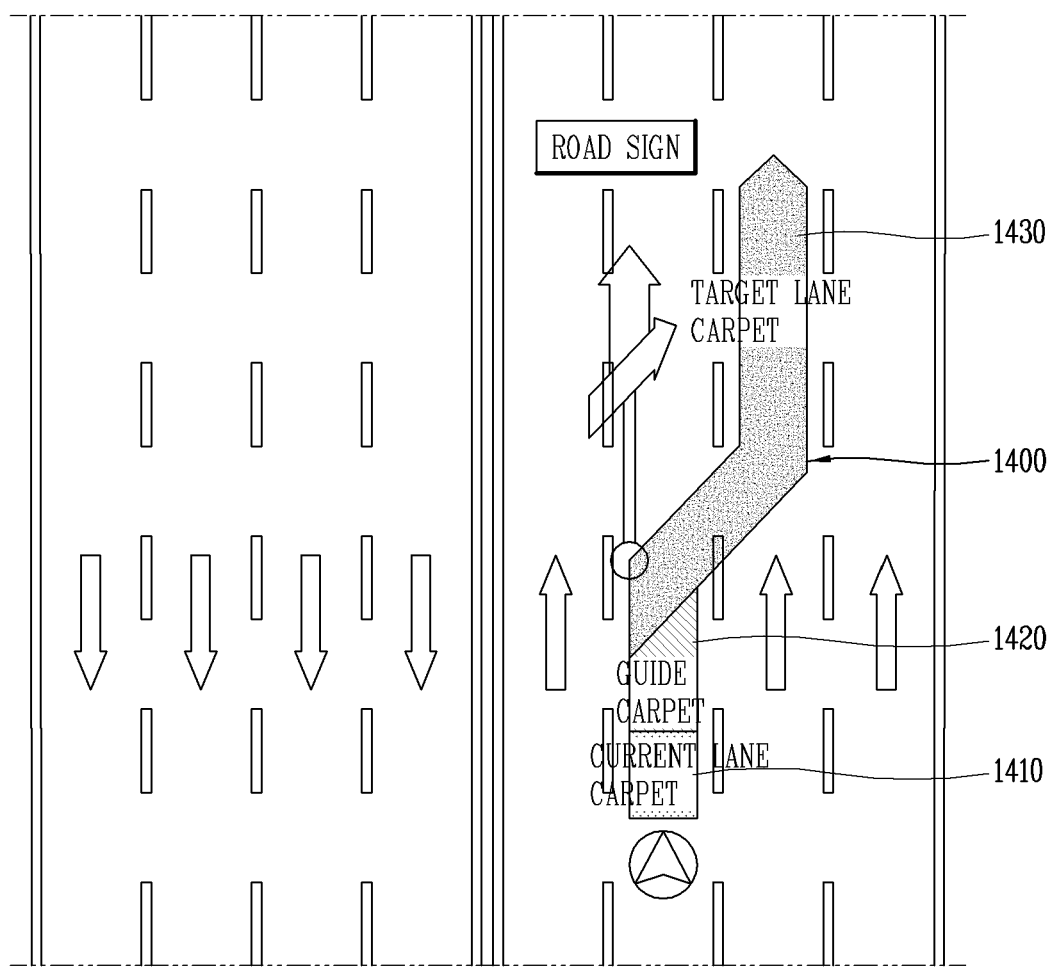
FIG. 22 is a conceptual view illustrating first to third sub carpet images.

FIG. 22 is a conceptual view illustrating first to third sub carpet images.

A first sub carpet image 1410 is a carpet image indicating the current driving lane of the vehicle. When a lane change is not required, only the first sub carpet image 1410 is output. The controller 870 may control the image output unit such that only the first sub carpet image 1410 is displayed or the first sub carpet image 1410, a second sub carpet image 1430, and a third sub carpet image 1420 are displayed based on a distance between the vehicle and a point at which the lane of the vehicle is to be changed. When the vehicle approaches the point within a predetermined distance, the second and third sub carpet images 1430 and 1420 are displayed together with the first sub carpet image 1410.

The second and third sub carpet images 1430 and 1420 are displayed together with the first sub carpet image 1410 when the vehicle needs to perform a lane change. The second sub carpet image 1430 is a carpet image indicating a target lane when the vehicle performs a lane change. The third sub carpet image 1420 is an image connecting the first carpet image 1410 and the second sub carpet image 1430, which guides a path for the driver to make a smooth or comfortable lane change.

Shapes of the first and second sub carpet images 1410 and 1430 may be changed according to other vehicles around the vehicle. In detail, when receiving location information and route information from another vehicle that satisfies a preset condition, the controller 870 controls the image output unit such that a length of the first carpet image 1410 and a length of the second carpet image 1430 are changed based on the location information and the route information. Meanwhile, when the lengths of the first and second sub carpet images 1410 and 1430 are changed, the controller 870 controls the image output unit such that a shape of the third sub carpet image 1420 connecting the first carpet image 1410 and the second sub carpet image 1430 is changed.

For example, when another vehicle adjacent to the lane of the vehicle is located within a predetermined distance from the vehicle, the controller 870 increases the length of the first sub carpet image 1410 to make the driver of the vehicle delay the timing of a lane change. Accordingly, the length of the second sub carpet image 1430 is reduced, and the shape of the third sub carpet image 1420 is changed.

The driver of the vehicle starts to make a lane change at a point where the first sub carpet image 1410 and the third sub carpet image 1420 meet. As the length of the first sub carpet image 1410 increases, the timing for the driver to make the lane change may be delayed. Thus, the present disclosure can prevent collision with other vehicles nearby when the driver changes lanes.

A part (or some) of the first to third sub carpet images 1410 to 1430 may be displayed in a shape or form different from the rest. In some implementations, a part of the first to third sub carpet images 1410 to 1430 may be displayed in a color different from the rest. This may allow the driver to clearly recognize when to make a lane change.

In the present disclosure, lane information defining a lane on which the vehicle is currently located is calculated by using a forward (or front) image captured from the vehicle, and a carpet image is output based on this. As the lane information is periodically corrected or adjusted, the present disclosure can provide an accurate driving route or path to the driver.

Hereinafter, a method of calculating current lane information of the vehicle will be described.

Figure 23:
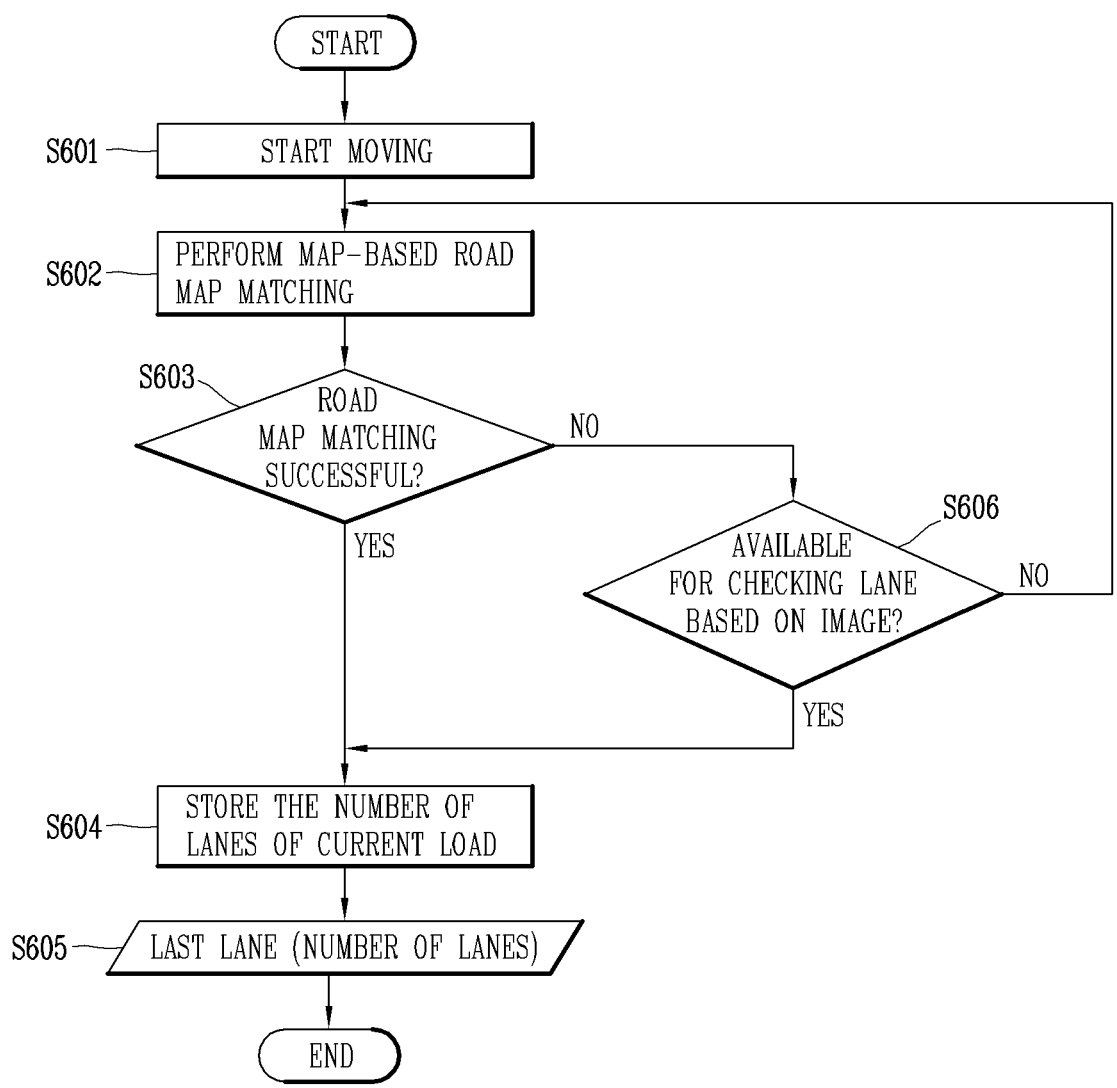
FIGS. 23 to 25 are flowcharts illustrating a method (or sequence) of calculating lane information of a vehicle.

FIG. 23 is a flowchart of calculating current lane information of a vehicle.

Referring to FIG. 23, when the vehicle starts running or moving (S601), the controller 870 performs road map matching based on a prestored road map (S602). If the road map matching is successful (S603), the controller 870 stores the number of lanes of a current road (S604), and stores the last lane of the current road as current lane information of the vehicle (S605).

If the road map matching fails (S606), the controller 870 calculates the number of lanes on the road based on the forward image (S606). When failing to calculate the number of lanes of the road based on the forward image, the controller 870 retries the road map matching.

Next, a method of updating lane information of the vehicle based the forward image will be described.

Figure 24:
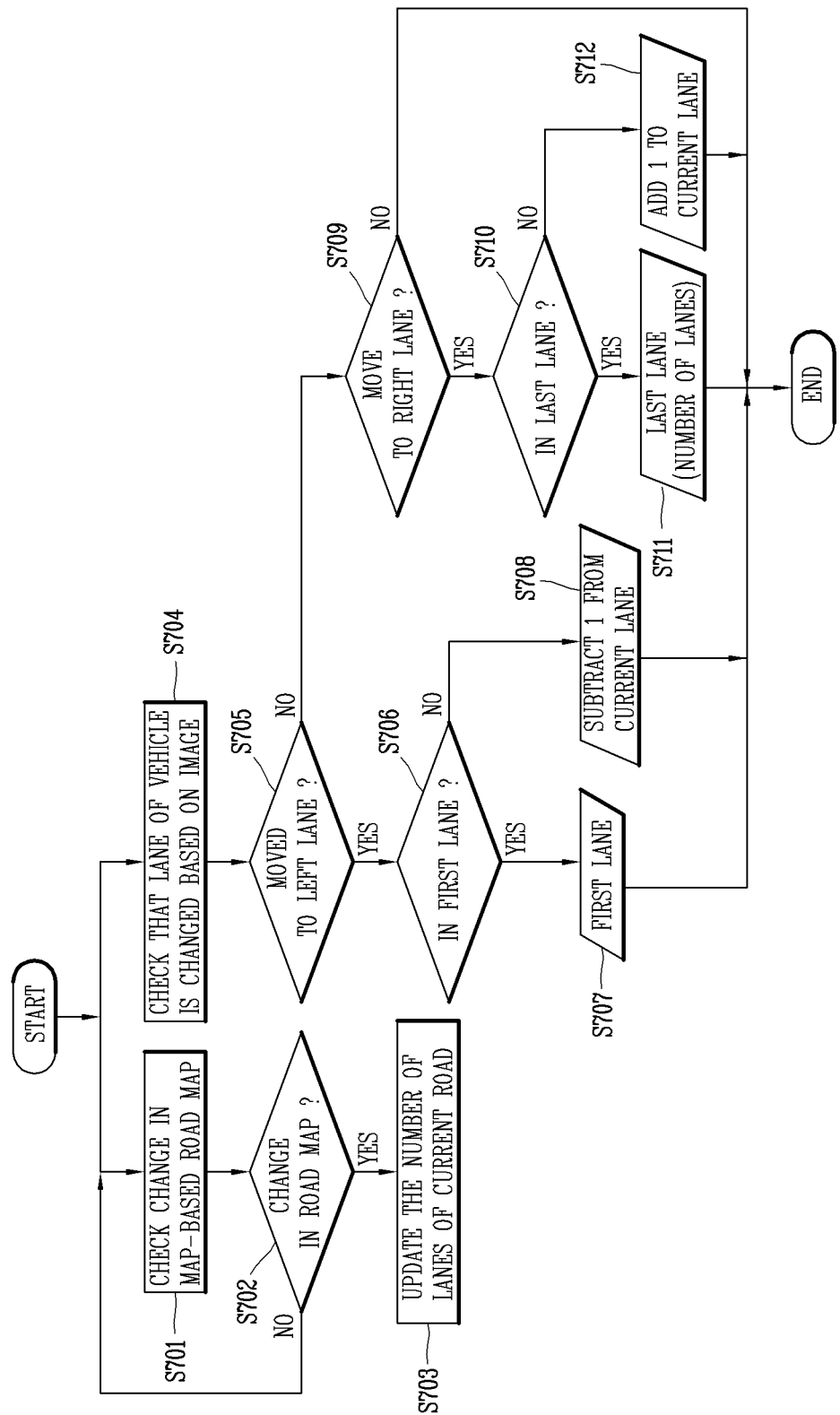

FIG. 24 is a conceptual view illustrating a method of updating lane information of a vehicle based on a forward image.

Referring to FIG. 24, the controller 870 checks whether there is a change in map-based road map (S701). When the road map is changed (S702), updates the number of lanes of a current road (S703).

Meanwhile, the controller 870 checks that the lane of the vehicle is changed based on the forward image (S704). The controller 870 checks if the vehicle is moved to a left lane (S705). When the vehicle is moved to the left lane, the controller 870 checks whether the vehicle is in the first lane (S706). When the vehicle is in the first lane (S707), the controller 870 stores current lane information of the vehicle as the first lane. When the vehicle is not in the first lane, the controller 870 subtracts one (−1) from the current lane position (or number) to update the current lane information (S708).

Meanwhile, when the vehicle is not moved to the left lane, the controller 870 checks if the vehicle is moved to a right lane (S709). When the vehicle is moved to the right lane, the controller 870 checks whether the vehicle is in the last lane (S710). When the vehicle is in the last lane, the controller 870 stores the last lane of the road identified in the road map as the current lane information of the vehicle (S711). On the other hand, when the vehicle is not in the last lane, the controller 870 adds one (+1) to the current lane position to update the current lane information (S712).

Meanwhile, when the vehicle is not moved to the right lane, the controller 870 determines that a lane change is not made by the vehicle and ends the lane information update.

Hereinafter, a method of updating lane information using a road link will be described.

Figure 25:
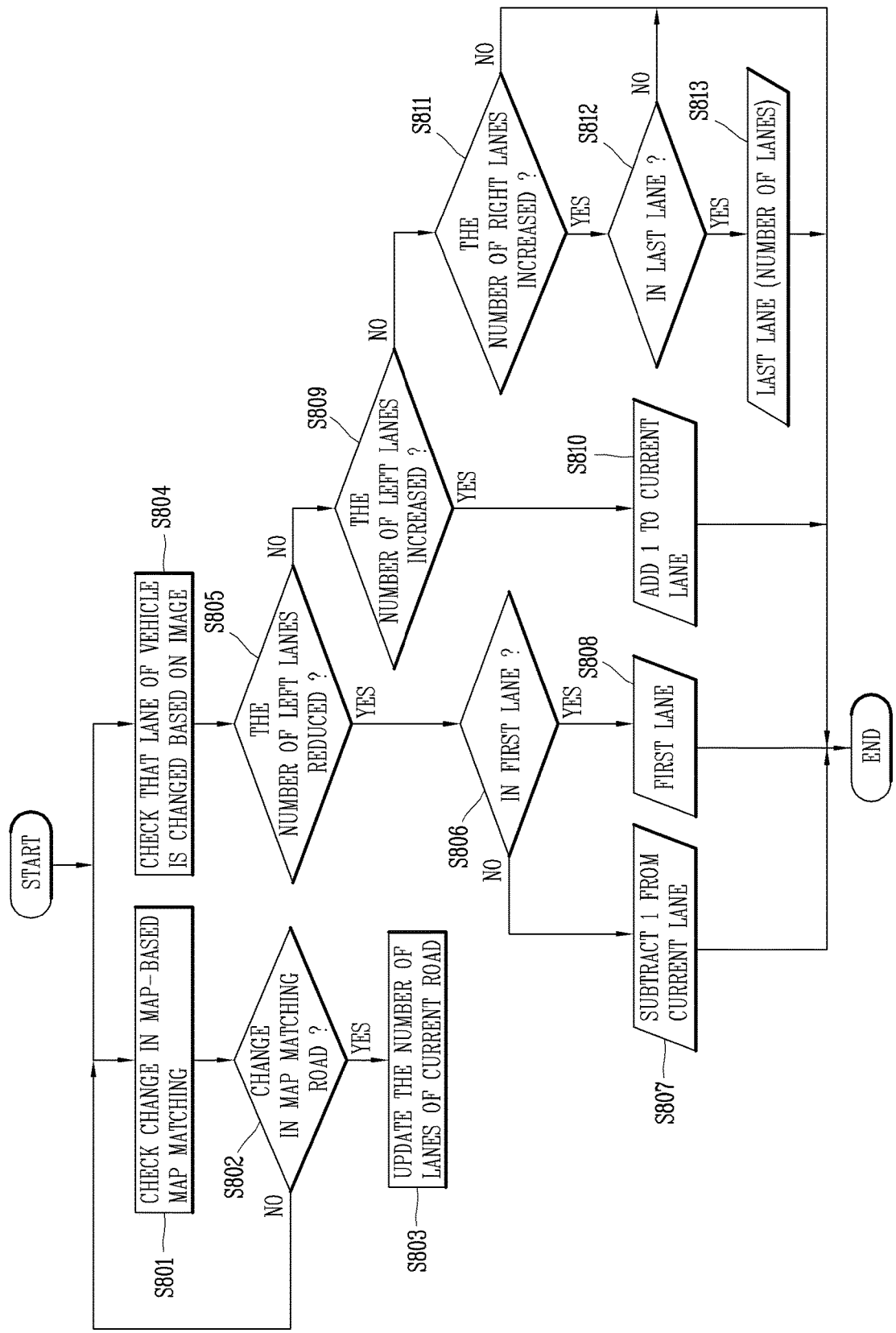

FIG. 25 is a conceptual view illustrating a method of updating lane information using a road link.

Referring to FIG. 25, the controller 870 checks whether there is a change in map-based road map. (S801). When the road map is changed (S802), the controller 870 updates the number of lanes of a current road (S803).

Meanwhile, the controller 870 checks that the lane of the vehicle is changed based on the forward image (S804). The controller 870 checks whether the number of left lanes (lanes at the left side of the vehicle) is reduced (S805). When the number of left lanes is reduced, the controller 870 checks if the vehicle is in the first lane (S806). When the vehicle is not in the first lane, the controller 870 subtracts one (−1) from the current lane position to update the current lane information (S807). When the vehicle is in the first lane (S808), the controller 870 stores the current lane information of the vehicle as the first lane.

On the contrary, when the number of left lanes is not decreased, the controller 870 checks if the number of left lanes is increased (S809). When the number of left lanes is increased, the controller 870 adds one (+1) from the current lane to update the current lane information (S810).

When the number of left lanes is not increased, the controller 870 checks if the number of right lanes (lanes at the right side of the vehicle) is decreased (S811). When the number of right lanes is decreased, the controller 870 checks whether the vehicle is in the last lane (S812). When the vehicle is in the last lane, the controller 870 stores the last lane of the road identified in the road map as the current lane information of the vehicle (S813). Meanwhile, when the vehicle is not in the last lane or the number of right lanes is not decreased, the controller 870 determines that a lane change is not made by the vehicle and ends the lane (information) update.

As described above, the controller 870 calculates current lane information of the vehicle by using the forward image, and outputs the carpet image based on the calculated lane information. Meanwhile, the controller 870 recalculates the current lane information of the vehicle based on the location information and the route information received from the another vehicle. When the calculated lane information using the forward image and the recalculated lane information are different, the controller 870 controls the image output unit such that the carpet image is changed.

That is, in the present disclosure, current lane information of the vehicle is adjusted or corrected through data transmission/reception between the vehicle and other vehicles nearby. Thus, the present disclosure can provide more accurate road navigation information to the driver.

Hereinafter, a method of correcting an error in lane information will be described in detail.

Figure 26:
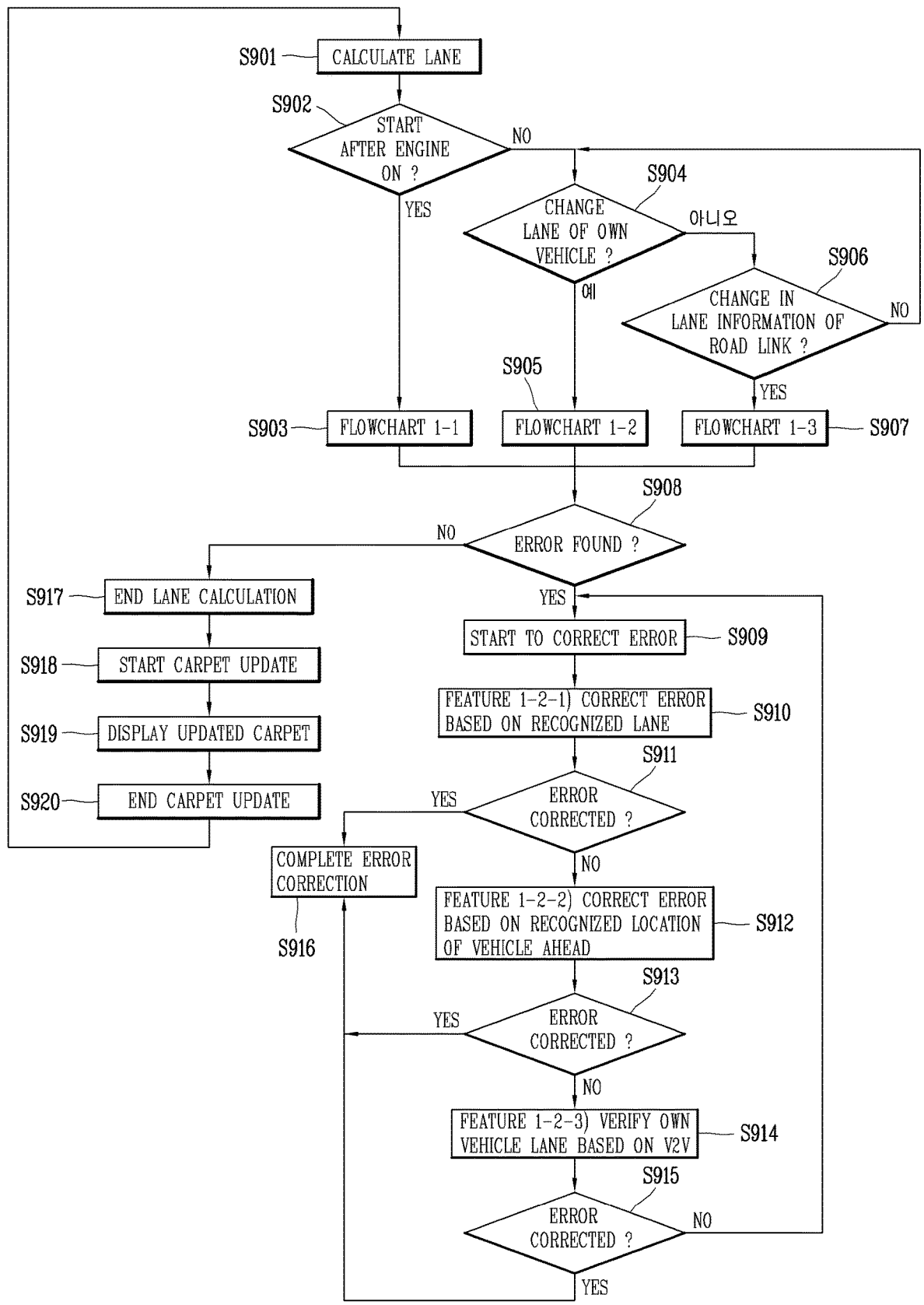
FIG. 26 is a flowchart illustrating a method of correcting an error in lane information.

FIG. 26 is a flowchart illustrating a method of correcting an error in lane information.

Referring to FIG. 26, the controller 870 calculates lane information using any one of the methods described with reference to FIGS. 23 to 25 (S901 to S907). Then, the controller 870 determines whether there is an error in the lane information (S908).

In detail, the controller 870 determines that there is an error in the lane information when a starting position of the vehicle is not the rightmost lane, when the lane is not recognizable from a camera image, or when there is an error in lane information of a map road link.

When it is determined that there is an error in the lane information, the controller 870 starts to correct the error (S909). More specifically, the controller 870 performs lane correction based on Feature 1-2-1) (S910).

Here, the Feature 1-2-1) is a centerline and boundary line of a road recognized in the forward image. When a lane left to the vehicle is recognized as the centerline or boundary line of the road in the forward image but the current lane information is not the first lane, the controller 870 corrects the current lane information of the vehicle to the first lane.

On the other hand, when a lane right to the vehicle is recognized as the boundary line of the road in the forward image but the current lane information is not the last lane of the road map, the controller 870 corrects the current lane information of the vehicle to the last lane of the road map.

Then, the controller 870 determines again whether there is an error in the lane information (S911). If an error is found, the controller 870 performs lane correction based on Feature 1-2-2) (S912).

Here, the Feature 1-2-2) is the number of other vehicles in the forward image. The controller 870 figures out or identifies the number of other vehicles located on the left or right side of the vehicle based on a camera position in the forward image. Then, the controller 870 adjusts or changes lane information based on the identified number of other vehicles.

After that, the controller 870 determines again whether there is an error in the lane information (S913). If an error is found, the controller 870 performs lane correction based on Feature 1-2-3) (S914).

The controller 870 receives lane information of other vehicles calculated from the other vehicles adjacent to the vehicle by a predetermined distance. Meanwhile, the controller 870 calculates the lanes of the other vehicles by using the forward image. The controller 870 receives lane information from a plurality of other vehicles adjacent to the vehicle and calculates the lane of each of the plurality of other vehicles.

Then, the controller 870 compares whether the received lanes and the calculated lanes match, and corrects the lane information of the vehicle by using the number of lane-matched vehicles and the number of lane-non-matched vehicles.

More specifically, when the number of lane-matched vehicles is less (or smaller) than the number of lane-non-matched vehicles, the controller 870 uses information received from the lane-non-matched vehicles to correct the lane (information) of the vehicle. When the number of lane-matched vehicles is greater than the number of lane-non-matched vehicles, the controller 870 does not correct the lane (information). When the number of lane-matched vehicles and the number of lane-non-matched vehicles are the same, the controller 870 reduces the period of receiving lane information from other vehicles, so that the number of lane-matched vehicles differs from the number of lane-non-matched vehicles.

When the error correction is made through the steps of S911, S913, and S915, the controller 870 completes the error correction (S916). Meanwhile, when there is no error in the lane information, the controller 870 updates and displays a carpet image (S917 to S920).

As described above, the image display device according to the present disclosure can accurately calculate lane information of the vehicle through data transmission/reception with another vehicle.

Meanwhile, the image display device according to the present disclosure displays various types of carpet images according to driving conditions.

Figure 27:
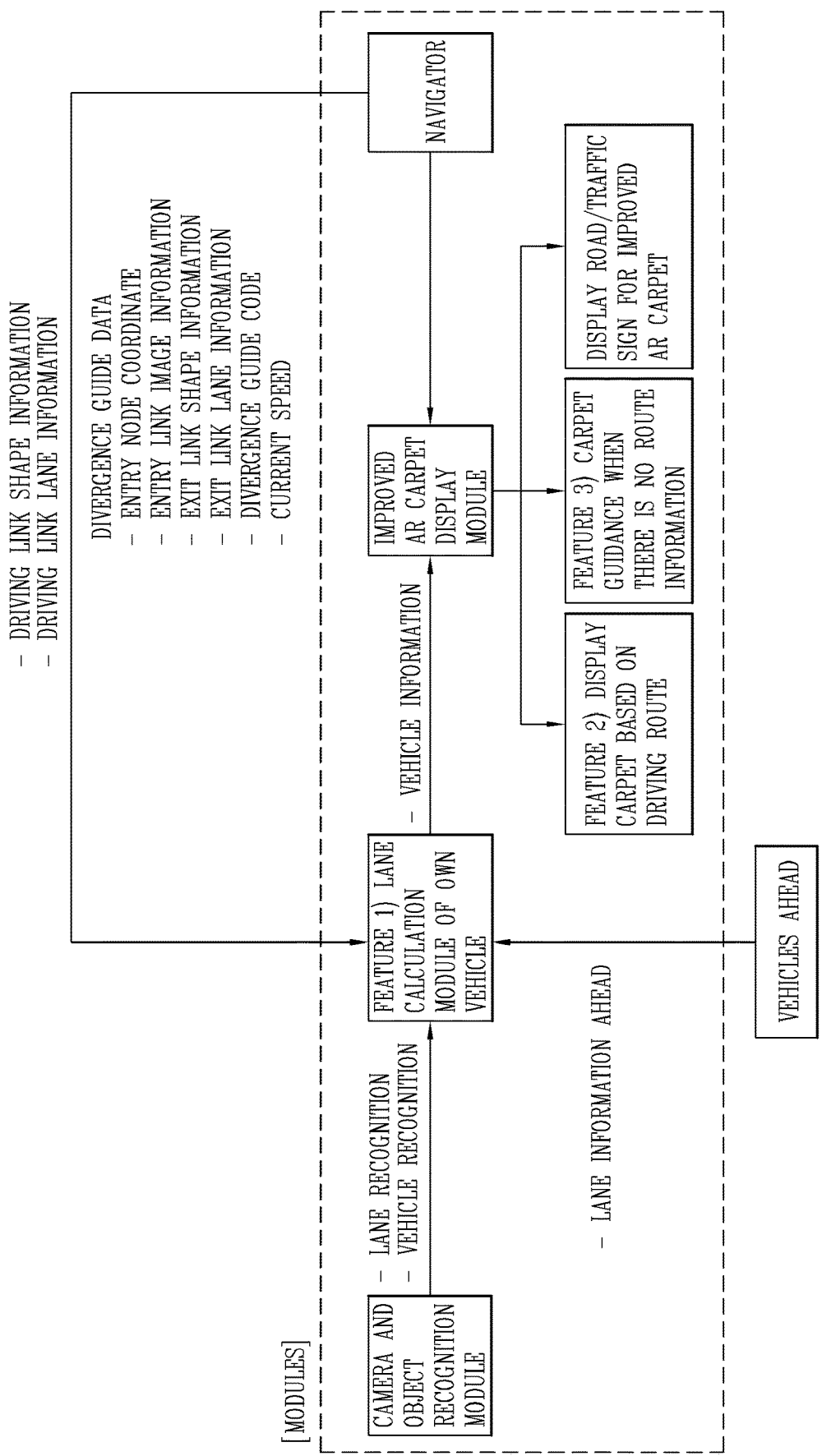
FIG. 27 is a block diagram illustrating a relationship between modules for displaying a carpet image.

FIG. 27 is a block diagram illustrating a relationship between modules for displaying a carpet image.

Referring to FIG. 27, the image display device according to the present disclosure displays a carpet image using information received from a camera and an object recognition module, a navigator, and other vehicles. The present disclosure displays a carpet image in three different conditions (or circumstances). In detail, a carpet image is displayed based on a driving route or path, a carpet image is displayed when there is no driving information, or a carpet image is displayed together with additional traffic information.

Hereinafter, detailed implementations will be described.

FIGS. 28 to 31 are conceptual views illustrating an implementation of displaying a carpet image based on a driving route.

Figure 28:
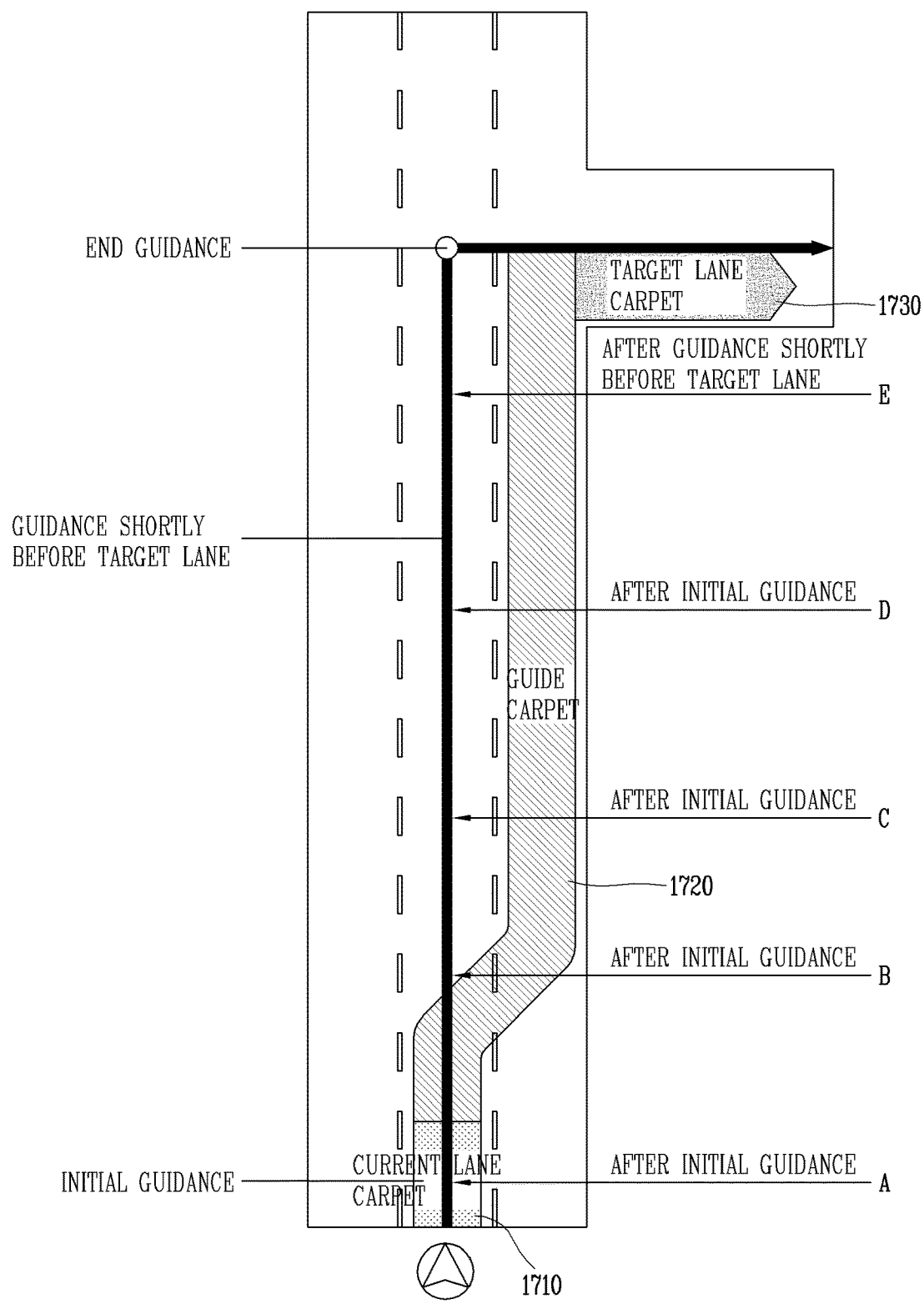
FIGS. 28 to 31 are conceptual views illustrating an implementation of displaying a carpet image according to a location of a vehicle.

Referring to FIG. 28, the controller 870 displays different carpet images according to a location of the vehicle on a driving route. More specifically, in FIG. 28, the location of the vehicle is indicated by five different points A to E. The controller 870 selectively displays different carpet images 1710 to 1730 according to the location of the vehicle on the driving route.

Figure 29:
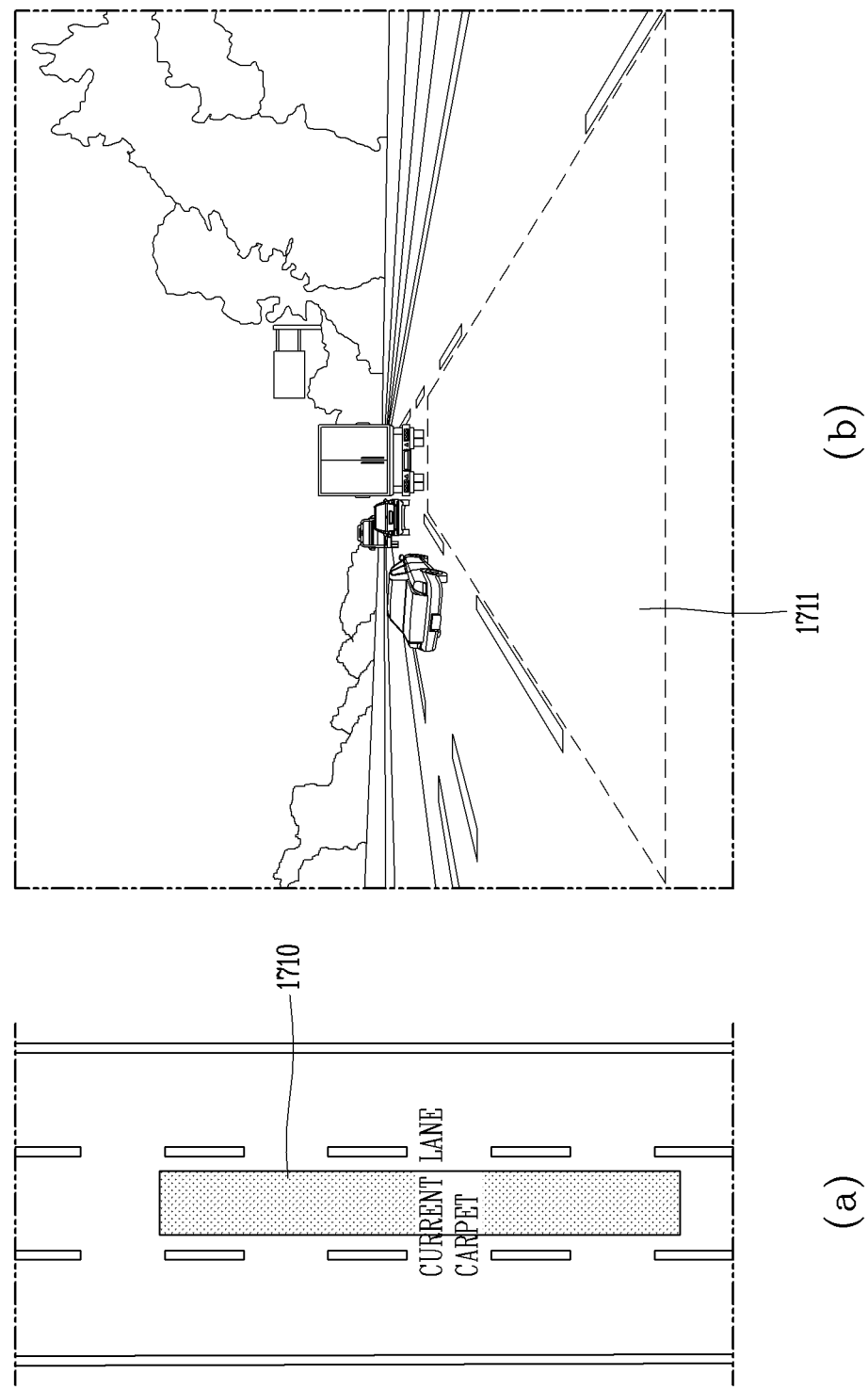
Figure 30:
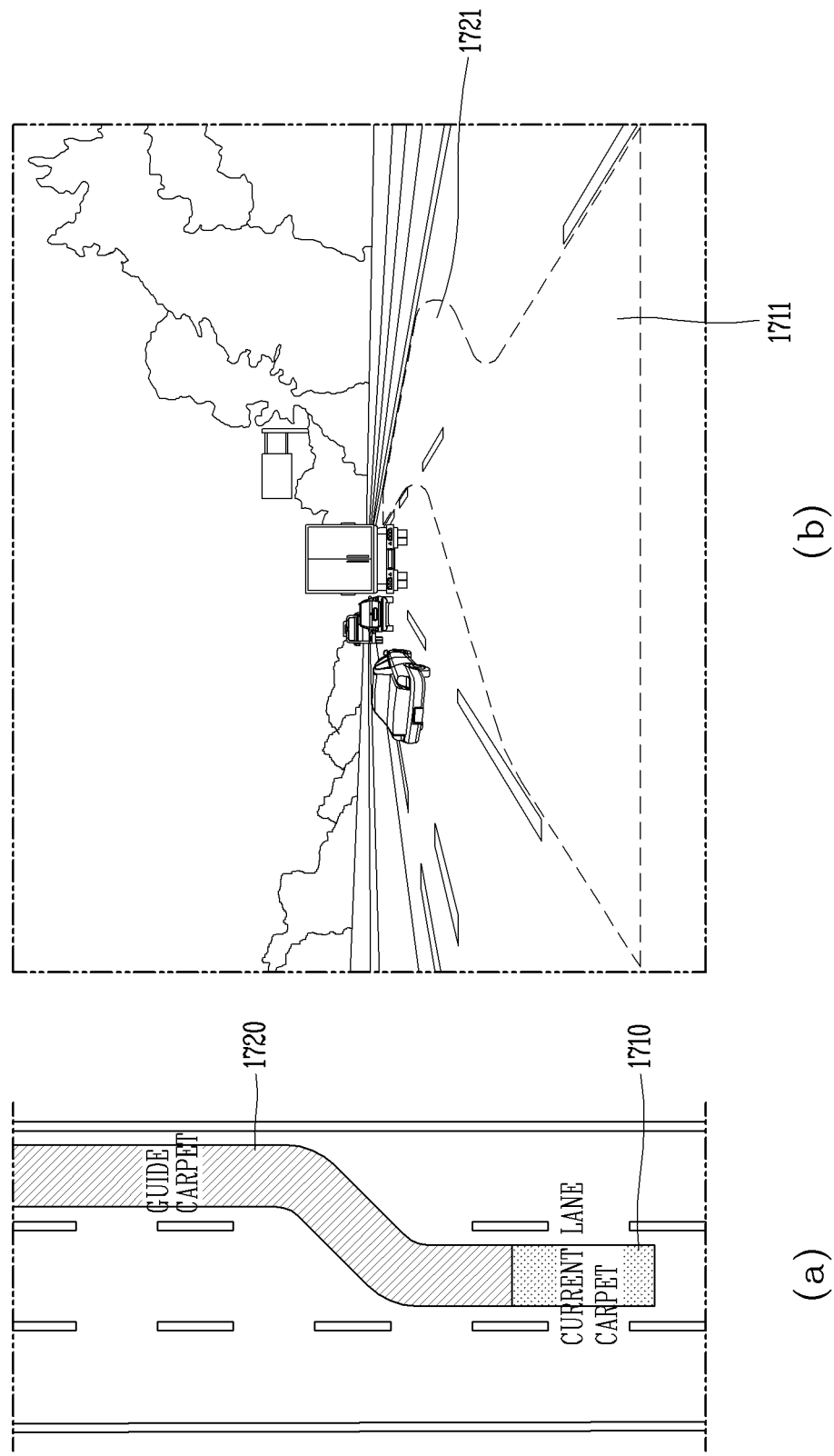
Figure 31:
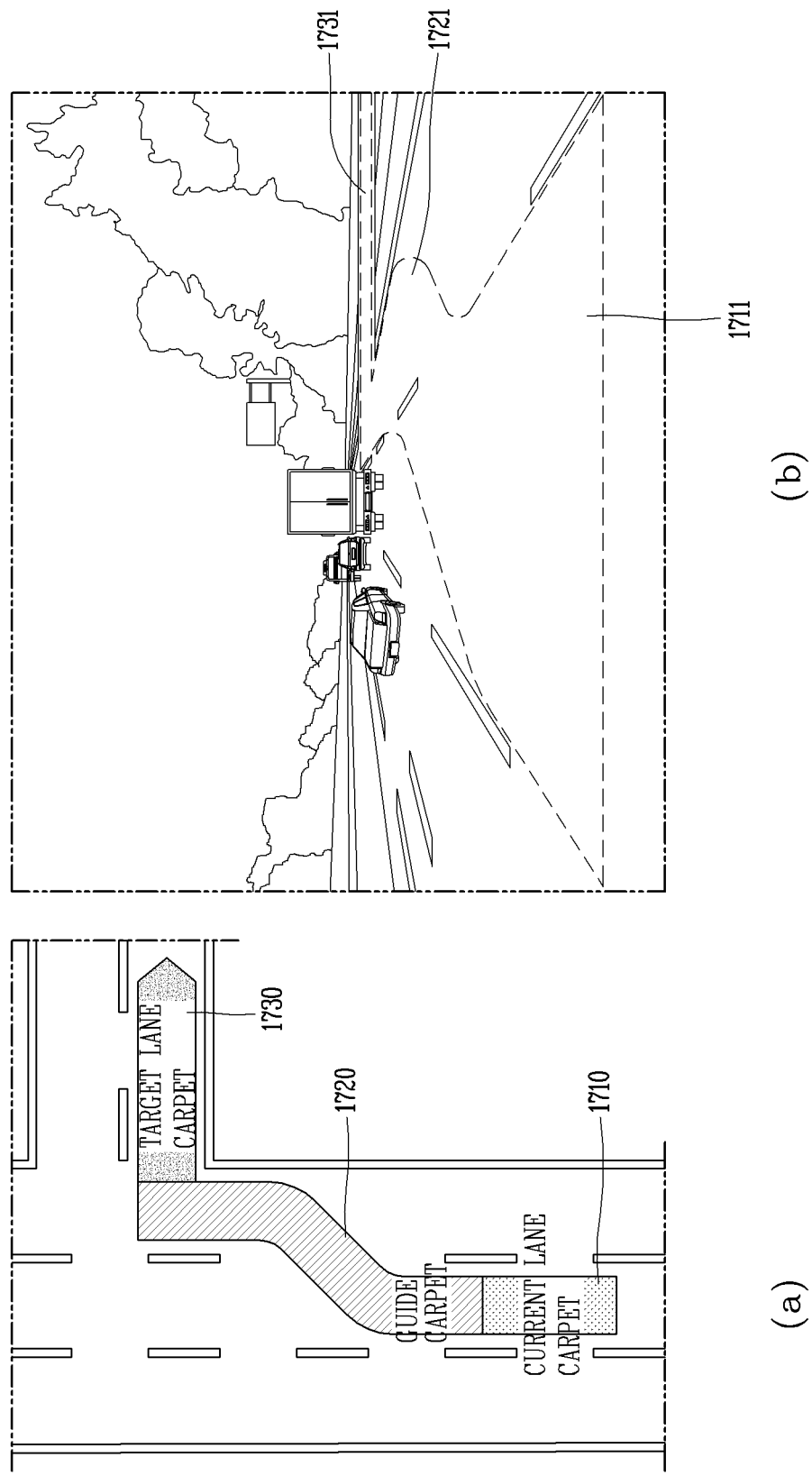

Referring to FIG. 29, when the vehicle is located at the point A, the controller 870 displays only a carpet image indicating the current driving lane of the vehicle. Then, referring to FIG. 30, when the vehicle is located at the point B, the controller 870 outputs a carpet image 1711 indicating the current driving lane of the vehicle and a carpet image 1721 indicating a lane to be in or targeted. Finally, referring to FIG. 31, when the vehicle is located at the point E, the controller 870 outputs the carpet image 1711 indicating the current driving lane of the vehicle, the carpet image 1721 indicating the lane to in, and a carpet image 1731 indicating an intersection to enter.

As described above, in the present disclosure, as different carpet images are displayed according to the location of the vehicle, route navigation information suitable for the driving situation can be provided to the driver.

Meanwhile, the present disclosure may display a carpet image even when there is no driving route information.

Figure 32:
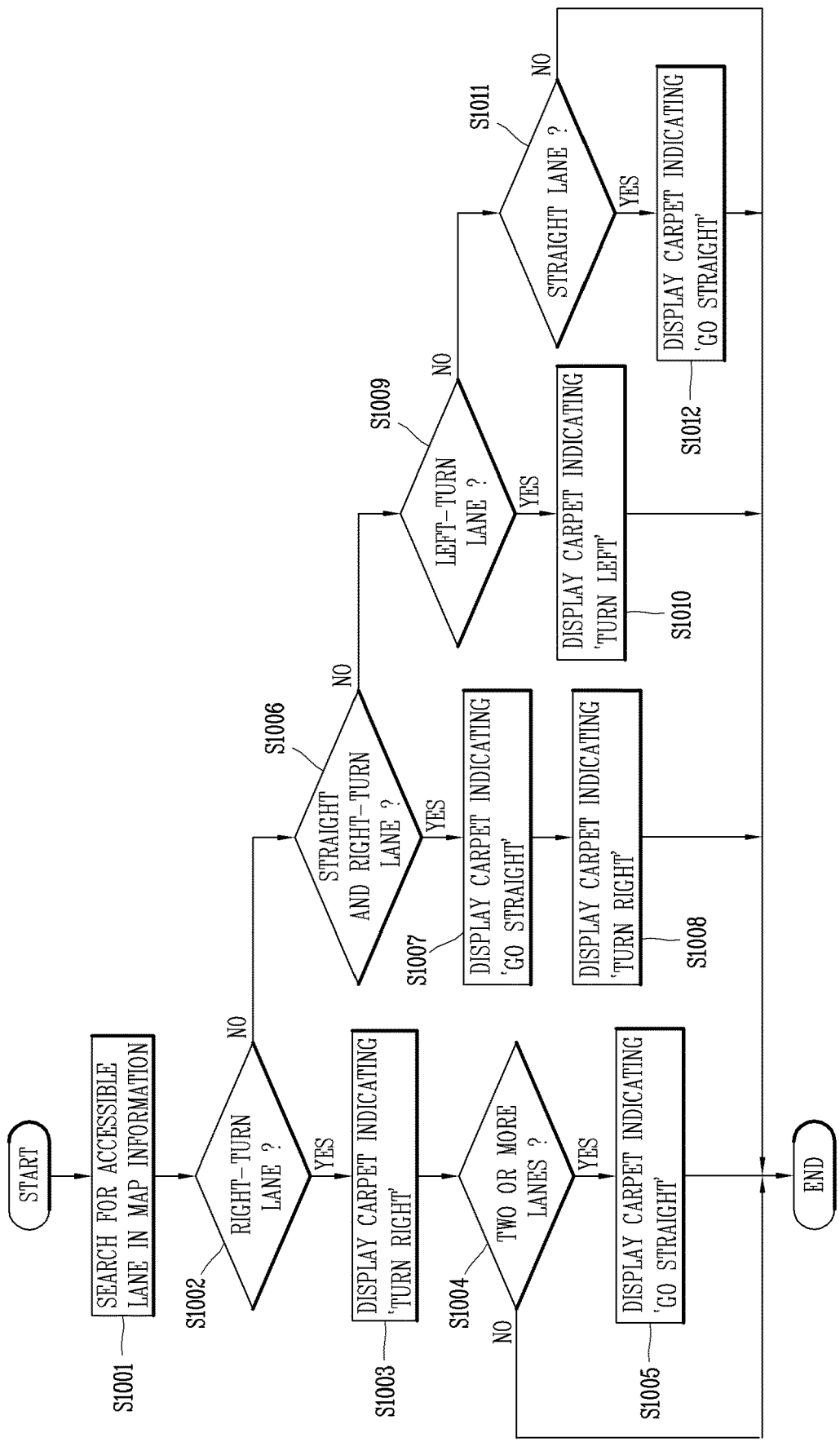
FIG. 32 is a flowchart illustrating a method of displaying a carpet image even when there is no driving route information.

FIG. 32 is a flowchart illustrating a method of displaying a carpet image even when there is no driving route information.

Referring to FIG. 32, the present disclosure may display a carpet image indicating a lane change at an intersection. More specifically, when the vehicle gets close to the intersection, the controller 870 searches for an accessible lane in map information (S1001). Then, the controller 870 determines whether the vehicle is on a right-turn lane (S1002). When the vehicle is on the right-turn lane, the controller 870 displays a carpet image indicating 'turn right' (S1003). In addition, the controller 870 determines whether there are two or more driving lanes on the road on which the vehicle is currently located (S1004). When there are two or more lanes, the controller 870 displays a carpet image indicating a path to go straight at the intersection (S1005).

When the vehicle is not on the right-turn lane, the controller 870 determines whether the vehicle is on a straight and right-turn lane (S1006). When the vehicle is on the straight and right-turn lane, the controller 870 displays a carpet image indicating 'go straight' at the intersection (S1007) and a carpet image indicating 'turn right' at the intersection (S1008).

When the vehicle is not on the straight and right-turn lane, the controller 870 determines whether the vehicle is on a left-turn lane (S1009). When the vehicle is on the left-turn lane, the controller 870 displays a carpet image indicating 'turn left' at the intersection (S1010).

When the vehicle is not on the left-turn lane, the controller 870 determines whether the vehicle is on a straight lane (S1011). When the vehicle is on the straight lane, the controller 870 displays a carpet image indicating 'go straight' at the intersection (S1012). When the vehicle is not on the straight lane, the controller 870 does not display the carpet image.

Meanwhile, although not shown, the controller 870 provides specific road navigation information to the driver by displaying graphic objects in the shape of a traffic sign, a direction (or indication) sign, and the like together with the carpet image describe above.

The present disclosure can be implemented as computer-readable codes (applications or software) in a program-recorded medium. The method of controlling the autonomous vehicle can be realized by a code stored in a memory or the like.

The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor or the controller. Therefore, it should also be understood that the above-described embodiments are not limited by any of the details of the foregoing description, unless otherwise specified, but rather should be construed broadly within its scope as defined in the appended claims. Therefore, all changes and modifications that fall within the metes and bounds of the claims, or equivalents of such metes and bounds are therefore intended to be embraced by the appended claims.

The invention claimed is:

1. An image output device provided in a vehicle to enable augmented reality, the device comprising:
   a controller configured to receive, in real time, a forward image capturing an image in front of the vehicle,
   search for one or more lanes on which the vehicle is expected to travel in the forward image,
   generate image information including a carpet image indicating the searched one or more lanes in lane units, and
   transmit the image information to an image output unit that outputs visual information, so that the image information is output to the image output device,
   wherein the controller receives location information and route information of another vehicle located within a predetermined distance from the vehicle, and
   generates, when the location information and route information received from the another vehicle satisfy a preset condition, image information that includes a carpet image having a different shape from the carpet image based on the location information and the route information.

2. The device of claim 1, wherein the controller generates image information that includes a carpet image having a different shape from the carpet image based on the location information and the route information when a route on which the vehicle is expected to travel and a route on which the another vehicle is expected to travel are at least partially the same.

3. The device of claim 2, wherein the carpet image comprises:
   a first sub carpet image indicating a current driving lane of the vehicle;
   a second sub carpet image indicating a target lane of the vehicle; and
   a third sub carpet image connecting the first and second sub carpet images to guide a path for a lane change.

4. The device of claim 3, wherein the controller, when the location information and route information received from the another vehicle satisfy the preset condition, generates image information including different sub carpet images, generated by changing lengths of the first and second sub carpet images, based on the location information and the route information.

5. The device of claim 4, wherein the controller generates image information including a different sub carpet image, generated by changing a length of the third sub carpet image connecting the first and second sub carpet images when the lengths of the first and second sub carpet images are changed.

6. The device of claim 3, wherein the controller generates image information only including the first sub carpet image or image information including the first to third sub carpet images based on a distance between a point at which a lane of the vehicle is to be changed and the vehicle.

7. The device of claim 2, wherein a part of the first to third sub carpet images has a different color from remaining sub carpet images.

8. The device of claim 1, wherein the controller calculates current lane information of the vehicle using the forward image, and generates image information including the carpet image based on the calculated lane information.

9. The device of claim 8, wherein the controller recalculates the current lane information of the vehicle based on the location information and the route information received from the another vehicle, and generates image information including a carpet image different from the carpet image when the calculated lane information using the forward image is different from the recalculated lane information.

10. An image output device provided in a vehicle to enable augmented reality, the device comprising:
    an image outputter configured to output visual information for enabling the augmented reality;
    a communicator configured to communicate with other vehicles and a server, and receive, in real time, a forward image capturing an image in front of the vehicle; and
    a controller configured to control the image outputter to search for one or more lanes on which the vehicle is expected to travel in the forward image, and to output a carpet image indicating the searched one or more lanes in lane units,
    wherein the controller controls the communicator to receive location information and route information of another vehicle located within a predetermined distance from the vehicle, and
    controls, when the location information and route information received from the another vehicle satisfy a preset condition, the image outputter such that the carpet image is changed based on the location information and the route information.

11. A method for controlling an image output device provided in a vehicle to enable augmented reality, the method comprising:
    receiving a forward image capturing an image in front of the vehicle;

searching for one or more lanes on which the vehicle is expected to travel in the forward image;

receiving location information and route information of another vehicle located within a predetermined distance from the vehicle;

generating image information that includes a carpet image indicating the searched one or more lanes in lane units using at least one of the forward image, the location information of the another vehicle, and the route information of the another vehicle, and transmitting the image information to an image outputter, wherein the method further comprises generating, when the location information and route information received from the another vehicle satisfy a preset condition, image information that includes a carpet image having a different shape from the carpet image based on the location information and the route information.

12. The method of claim 11, further comprising generating image information that includes a carpet image having a different shape from the carpet image based on the location information and the route information when a route on which the vehicle is expected to travel and a route on which the another vehicle is expected to travel are at least partially the same.

13. The method of claim 12, wherein the carpet image comprises:
a first sub carpet image indicating a current driving lane of the vehicle;
a second sub carpet image indicating a target lane of the vehicle; and
a third sub carpet image connecting the first and second sub carpet images to guide a path for a lane change.

14. The method of claim 13, further comprising generating, when the location information and route information received from the another vehicle satisfy the preset condition, image information including different sub carpet images, generated by changing lengths of the first and second sub carpet images, based on the location information and the route information.

15. The method of claim 14, further comprising generating image information including a different sub carpet image, generated by changing a length of the third sub carpet image connecting the first and second sub carpet images when the lengths of the first and second sub carpet images are changed.

16. The method of claim 13, further comprising generating image information only including the first sub carpet image or image information including the first to third sub carpet images based on a distance between a point at which a lane of the vehicle is to be changed and the vehicle.

17. The method of claim 12, wherein a part of the first to third sub carpet images has a different color from remaining sub carpet images.

18. The method of claim 11, further comprising:
calculating current lane information of the vehicle using the forward image; and
generating image information including the carpet image based on the calculated lane information.

19. The method of claim 18, further comprising:
recalculating the current lane information of the vehicle based on the location information and the route information received from the another vehicle; and
generating image information including a carpet image different from the carpet image when the calculated lane information using the forward image is different from the recalculated lane information.

20. The method of claim 18, wherein the recalculating of the current lane information of the vehicle is performed when a lane is not recognizable form the forward image, or when there in an error in lane information of a map road link received from the outside.

* * * * *